United States Patent
Colon et al.

(10) Patent No.: US 12,511,182 B1
(45) Date of Patent: Dec. 30, 2025

(54) ENRICHED ANOMALOUS COMPUTER ACTIVITY DETECTION WITH LANGUAGE MODELS

(71) Applicant: Amazon Technologies, Inc., Seattle, WA (US)

(72) Inventors: Brendan Cruz Colon, Seattle, WA (US); Matthew Michael Sommer, Friday Harbor, WA (US); Consuelo Manas Pilot, Ponte Vedra, FL (US); Joshua Scott Hansen, Sahuarita, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 18/532,898

(22) Filed: Dec. 7, 2023

(51) Int. Cl.
| | |
|---|---|
| *G06F 11/07* | (2006.01) |
| *G06F 16/242* | (2019.01) |
| *H04L 9/40* | (2022.01) |
| *H04L 41/16* | (2022.01) |

(52) U.S. Cl.
CPC ...... *G06F 11/0778* (2013.01); *G06F 16/2425* (2019.01); *H04L 41/16* (2013.01); *H04L 63/1425* (2013.01); *H04L 63/1433* (2013.01)

(58) Field of Classification Search
CPC ............ G06F 11/0778; G06F 11/366; G06F 11/0751; G06F 11/3612; G06F 11/3636; G06F 11/3476; G06F 16/1734; G06F 16/113; G06F 16/2425; G06F 21/554; G06F 21/552; G06F 16/243; G06F 16/955; G06F 21/44; G06F 21/53; G06F 21/57; H04L 63/1425; H04L 63/1416; H04L 63/1433; H04L 41/16; H04L 67/55; H04L 63/0428; H04L 67/125; H04L 63/083; H04L 63/08; H04L 63/10; H04W 12/08; H04W 12/06

See application file for complete search history.

(56) References Cited

U.S. PATENT DOCUMENTS

2021/0149790 A1* 5/2021 Renner ............... G06F 11/0778

FOREIGN PATENT DOCUMENTS

| WO | WO-2022224262 A1 * | 10/2022 | ......... H04L 63/1433 |
| WO | WO-2024112501 A1 * | 5/2024 | ......... G06F 16/2425 |

* cited by examiner

*Primary Examiner* — Kyung H Shin
(74) *Attorney, Agent, or Firm* — Knobbe, Martens, Olson & Bear, LLP

(57) ABSTRACT

A system enriches detections of anomalous computer-related activity with output from a language model. The detection and enrichment system uses Bayesian inference to model the likelihood that a co-occurrence of a detection event and an enriched detection event indicate an actual attack. The detection and enrichment system uses a question answering model, to process text data, such as, but not limited to, transcripts or emails. A language model is trained to detect potential attacks based on labelled training data, such as, but not limited to, transcripts or emails with examples of a type of attack.

20 Claims, 9 Drawing Sheets

ENRICHED ANOMALOUS COMPUTER ACTIVITY DETECTION WITH LANGUAGE MODELS

BACKGROUND

In a cybersecurity context, organizations have to face malicious actors that attempt to collect, disrupt, deny, degrade, or destroy information system resources or the information itself. Phishing is a type of cybersecurity attack where malicious actors send messages pretending to be a person or entity. Phishing messages can manipulate an agent, causing them to perform actions like installing a malicious file, clicking a malicious link, or divulging sensitive information such as access credentials. Unauthorized data exfiltration and other computer-network based attacks continue to grow year-over-year. In some systems, automated logic is applied to computer network data and/or behavior data to detect anomalous activity. Detections and their related cases can be manually reviewed by an analyst at a Security Operations Center. Following review at the Security Operations Center, the case can be dismissed or referred for further investigation and/or remediation.

In natural language processing, a computer can process human speech, such as text written by a human. Topic extraction models are capable of extracting topics (represented as a set of words) that occur in some text. A natural language processing transformer model can be configured to process sequential input data, such as natural language. Transformers can process the entire input all at once, such as a natural language sentence, paragraph, or document. The attention mechanism-enhancing some parts of the input data while diminishing other parts—for transformers provides context for any position in the input sequence. The attention function for a transformer model can be a mapping between a query and a set of key-value pairs to an output. Transformer models can be trained with unsupervised machine learning.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
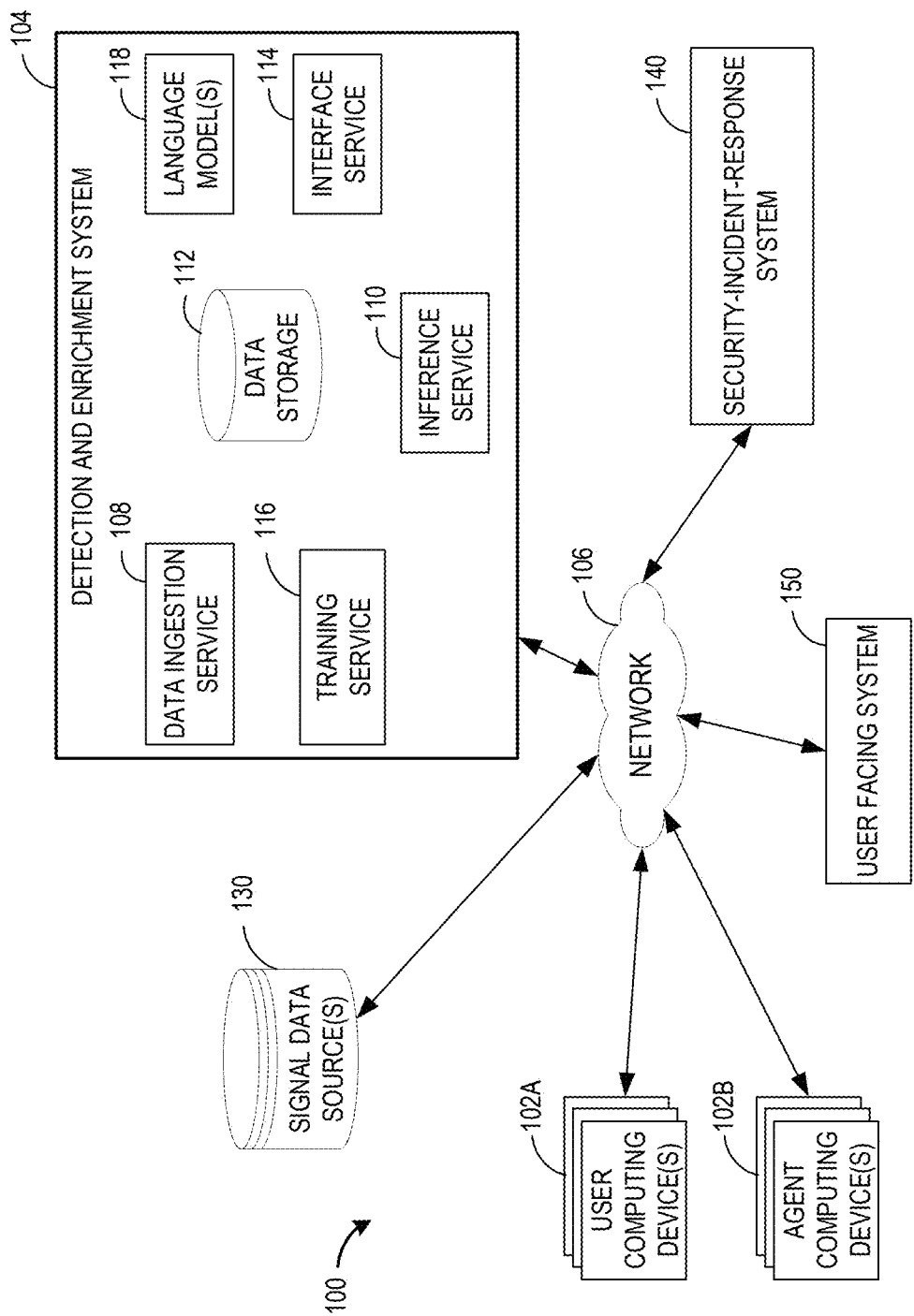
FIG. 1 is a schematic block diagram depicting an illustrative network environment for implementing a detection and enrichment system.

As described above, organizations must be cautious of malicious actors performing cybersecurity attacks and social engineering against the organization. In some systems, an automated detection system can process computer network data and/or behavior data to detect anomalous computer-related activity. Detections and their related cases can be manually reviewed by an analyst at a Security Operations Center. However, the enormous volume of detections can make it challenging for analysts to identify actual attacks from false positives. Therefore, there can be a need for automated enrichments to detections to determine priority risk indicators to flag certain cases as higher priority for manual review and/or trigger an automated response.

Moreover, malicious actors can use manual and automated methods (such as using malicious automated chat bots) to communicate with agents of the organization for malicious purposes, such as, but not limited to, collecting sensitive information and/or obtaining unauthorized access to sensitive services or accounts. The organization can collect the communications by the agents with others. However, the enormous volume of user-agent communications can make it technically challenging to automatically process the text data, such as transcripts or emails, to identify meaningful patterns that can be used as enrichments to detections of anomalous computer-related activity.

Generally described, aspects of the present disclosure are directed to enriching detections of anomalous computer-related activity with data analytics informed by a language model. A detection and enrichment system can use Bayesian inference to model the likelihood that a co-occurrence of a detection event and an enriched detection event indicate an actual attack. The detection and enrichment system can use a language model, such as a question answering model, to process text data, such as, but not limited to, transcripts or emails. Example questions that can be used by the question answering model can include, but are not limited to: In a yes/no response, did the agent ask a customer for their password? In a yes/no response, did the customer ask to register another account or device? Additionally or alternatively, a language model can be trained to detect potential attacks based on labelled training data, such as, but not limited to, transcripts or emails with examples of a type of attack. The detection and enrichment system can determine an enrichment based on the output of a language model, such as, but not limited to, a threshold number of communications for an agent indicative of an attack within a period of time. The detection and enrichment system can model different possible combinations of enrichments that co-occur with detections to determine those combinations where the co-occurrence of a detection with one or more enrichments are a better predictor for an attack than a detection by itself. In some embodiments, the detection and enrichment system can cause automated or semi-automated actions to occur in response to detecting patterns, such as, but not limited to, banning a user from chat due to detected likely malicious activity and/or blocking access to a network service.

The systems and methods described herein may improve computer performance. As described herein, some pre-trained machine learning models can be available in different sizes, use different amounts of computing memory, and/or can have different performance metrics. The solutions described herein may address the data storage, memory, and performance challenges with respect to using pre-trained natural language processing models. By initially using a relatively larger, more hardware intensive machine learning model to output results, those results can be used to train a relatively smaller, less hardware intensive pre-trained machine learning model for better performance. Therefore, the systems and methods described herein can improve the operation of a computer via using machine learning models that use fewer computing resources. A computing resource can refer to a physical or virtual component of limited availability within a computer system. Computing resources can include, but are not limited to, computer processors, processor cycles, and/or memory.

Moreover, modeling different combinations of enrichments that co-occur with a detection can be computationally intensive. Where n represents how many distinct enrichments are modeled to co-occur with a detection and k enrichments are chosen to be modeled together, the formula for n choose k is provided below (also known as the binomial coefficient).

$$\binom{n}{k} = \frac{n!}{k!(n-k)!}$$

If there are ten enrichments (n=10), where k=1, there are 10 possible combinations; where k=2, there are 45 possible combinations; where k=3, there are 120 possible combinations; etc. There are $2^n-1$ possible combinations. Thus, to model all possible combinations of n=10 enrichments, there are 1023 possible combinations. To model all possible combinations of one thousand enrichments for each detection, where n=1000, there would be $1.07^{301}$ possible combinations per detection. Therefore, brute-force modeling of every possible combination of enrichments that co-occur with a detection can be computationally intensive. Instead, the systems and methods described herein can use a model where co-occurring enrichments for a detection are converted into a graph network. In the graph network, each node can represent an enrichment and edges join nodes that co-occur at least a threshold number of times, q. Cliques can be determined in the graph network. The system can determine most occurring cliques until a threshold number of co-occurring enrichments has been identified instead of determining all possible combinations. Therefore, the systems and methods described herein can improve the operation of a computer via graph network technology that uses fewer computing resources than brute-force approaches.

The systems and methods described herein may improve cybersecurity. As described herein, malicious actors can use social engineering to attack organizations. The solutions described herein may address the technical challenges of automatically identifying patterns and malicious actors. In the case of automated bots being used in conversations with agents, the language model techniques described herein can be used to detect the automated bots and/or the output from the automated bots. The malicious bots may use zero-shot learning to output text, and, in some embodiments, the techniques described herein can use machine learning with language models to discover the malicious bots via multiple "shots." By identifying malicious patterns, a system can automatically block malicious actors based on identified patterns, such as, but not limited to, blocking communications originating from particular IP addresses or detecting common text patterns in phishing attacks. Therefore, the systems and methods described herein can improve over traditional cybersecurity techniques and may be intrinsically tied to computer technology.

The systems and methods described herein may improve natural language processing technology. Training machine learning models on labelled training data can be an important part of supervised or semi-supervised machine learning. The solutions described herein may address the technical challenges of generating consistent and useful training data. Thus, the systems and methods described herein can be an improvement over traditional machine learning techniques.

As used herein, a "detection" can refer to an indication that an action has been performed one or more times within a timeframe. A detection can include a Boolean result, such as true result that the action has been performed one or more times within the timeframe. In some cases, a detection does not need to include a Boolean result and can instead include a percentage, such as a 90% likelihood that an action has been performed. A detection system can include thresholds for the detections. If thresholds are set too low, then high false positives (low precision) may result, where legitimate actions are flagged and/or prevented, ultimately wasting resources to investigate such false positives. Conversely, if thresholds are set too high, then anomalous actions and/or network attacks may slip through undetected (low recall). Moreover, detections may not be inherently descriptive. For example, a detection may focus on a specific action and may not include the context of several actions, which may be part of a modus operandi for a particular type of attack. As described herein, a detection can be enhanced with an enrichment.

An enrichment can be based on different types of signals. Enrichments can be descriptive and/or quantitative. Descriptive enrichments can include, but are not limited to, a type of communication (such as a type of transcript), a type of profile (such as a type of account), a type of geolocation associated with the profile, type(s) of individual(s) associated with a profile, and/or any other categorical variables that describe a profile and/or its properties. Quantitative enrichments can include a gradient. Quantitative enrichments can include, but are not limited to, anomalous computer-related activity during unusual hours, anomalous network rights provisioning, anomalous IP addresses, anomalous network skills usage, quantities of anomalous user communications, etc. Enrichments can include gradients that quantitatively place a profile's behavior along a spectrum relative to the behavior of other profiles (e.g., using statistical analysis). Co-occurrence between an enrichment and a detection can include, but is not limited to, both the enrichment and the detection being associated with the same profile or some other common metadata. Co-occurrence between an enrichment and a detection can include, but is not limited to, both the enrichment and the detection occurring in a same time period.

Turning to FIG. 1, an illustrative network environment 100 is shown in which a detection and enrichment system 104 may enrich detections of anomalous computer-related activity with machine learned natural language analysis. The network environment 100 may include one or more user computing devices 102A, the detection and enrichment system 104, a user facing system 150, one or more agent computing devices 102B, one or more signal data sources 130, and a security-incident-response system 140. The detection and enrichment system 104 may include a data ingestion service 108, a training service 116, an inference service 110, an interface service 114, one or more language models 118, and a data storage 112. As shown, the constituents of the network environment 100 may be in communication with each other over a network 106. In other embodiments, some of the constituents of the network environment 100 may be in communication with each other locally.

The detection and enrichment system 104 can receive signals from the signal data source(s) 130. The data ingestion service 108 can process signals from the signal data source(s) 130. The inference service 110 can apply coded logic to the processed signals to determine a detection of anomalous computer-related activity. Non-limiting coded logic can include logic associated with detecting data exfiltration. For example, the inference service 110 can apply logic to processed signals to detect a copy/paste action, such as, but not limited to, a threshold number of copy/pastes of sensitive information. The inference service 110 can process additional signals to identify one or more co-occurring enrichments that are statistically predictive of an attack. As described herein, the inference service 110 can apply a Bayesian inference to co-occurring detections and enrichments to identify combinations of a detection co-occurring with one or more enrichments that are predictive of an attack. The inference service 110 can use machine learned natural language analysis to identify enrichments that co-occur with certain detections and, therefore, are a priority risk indicator. The interface service 114 can communicate results from the inference service 110 to the security-incident-response system 140. Some of the data described herein, such as, but not limited to, processed signals, detections, and/or enrichments can be stored in the data storage 112.

The user facing system 150 can be the system that allows users using the user computing devices 102A to interact with agents using the agent computing devices 102B. In some embodiments, users of the user facing system 150 may communicate with an agent, such as a customer service agent. Example communications can include, but are not limited to, spoken communication and/or written communication, such as chat or email.

In some embodiments, the user facing system 150 can be an electronic catalog system. The electronic catalog system may include or be in communication with a data store of information about items that may be listed for sale, lease, etc. by an electronic marketplace, sellers, merchants and/or other users. The item information in this data store may be viewable by end users through a browsable or searchable electronic catalog in which each item may be described in association with a network page, such as an item detail page, describing the item. Each item detail page may include, for example, an item image and description, customer ratings, customer and professional reviews, sales rank data, lists of related items, and/or other types of supplemental data that may assist consumers in making informed acquisition decisions. A network page can be provided that enables users to interact with items, such as selecting, acquiring, or consuming items (such as watching or playing a media content item). Users of the system may, in some embodiments, locate specific item detail pages within the electronic catalog by executing search queries, navigating a browse tree, and/or using various other navigation techniques.

User computing devices 102A and agent computing devices 102B can include, but are not limited to, a laptop or tablet computer, personal computer, personal digital assistant (PDA), hybrid PDA/mobile phone, smart wearable device (such as a smart watch), mobile phone, and/or a smartphone. While a user computing device 102A may appear to be directly operated by a user, some user computing devices 102A may be operated by a malicious bot.

As described herein, the inference service 110 can use machine learned natural language analysis to identify enrichments that co-occur with certain detections and, therefore, are a priority risk indicator. The data ingestion service 108 can receive communications data (such as transcripts between users and agents) from the user facing system 150 and can store corresponding data in the data storage 112. The inference service 110 can make one or more inferences based on communications data from the data storage 112. The inference service 110 can execute question answering model(s) and receive answers to questions based on the processed communications data. As described herein, the answers to the questions can be used for a variety of purposes, such as, but not limited to, using the answers to identify patterns and ultimately potential attacks. In some embodiments, the training service 116 can train one or more machine learning models based on data from the data storage 112, such as the communications data. The inference service 110 can execute a specifically trained language model to identify communications indicative of an attack. The inference service 110 can determine an enrichment based on the output of a language model, such as, but not limited to, a threshold number of communications for an agent indicative of an attack within a period of time. In some embodiments, the interface service 114 can provide the results of the inference service 110 to another system, such as the security-incident-response system 140.

The security-incident-response system 140 can receive the co-occurring detections and enrichments as priority risk indicators. In some embodiments, the security-incident-response system 140 can take automated actions, such as, but not limited to, limiting communications, or otherwise blocking the identified malicious actors. Additionally or alternatively, the interface service 114 can flag cases, in the security-incident-response system 140, with priority risk indicators for prioritized review by an analyst at a Security Operations Center/Incident Response Center. Following review at the Security Operations Center/Incident Response Center, the case can be dismissed or referred for further investigation and/or remediation.

The data storage 112 may be embodied in hard disk drives, solid state memories, or any other type of non-transitory computer readable storage medium. The data storage 112 may also be distributed or partitioned across multiple local and/or remote storage devices. The data storage 112 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

The user computing devices 102A, the agent computing devices 102B, the detection and enrichment system 104, the security-incident-response system 140, and/or the user facing system 150 may each be embodied in a plurality of devices. Each of the user computing device 102A, the agent computing device 102B, the detection and enrichment system 104, the security-incident-response system 140, and/or the user facing system 150 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program (a.k.a., computer-executable) instructions that the hardware processor executes in order to operate the user computing device 102A, the agent computing device 102B, the detection and enrichment system 104, the security-incident-response system 140, and/or the user facing system 150. The memory generally includes RAM, ROM, and/or other persistent and/or auxiliary non-transitory computer readable storage media.

Additionally, in some embodiments, the detection and enrichment system 104, the security-incident-response system 140, and/or the user facing system 150 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
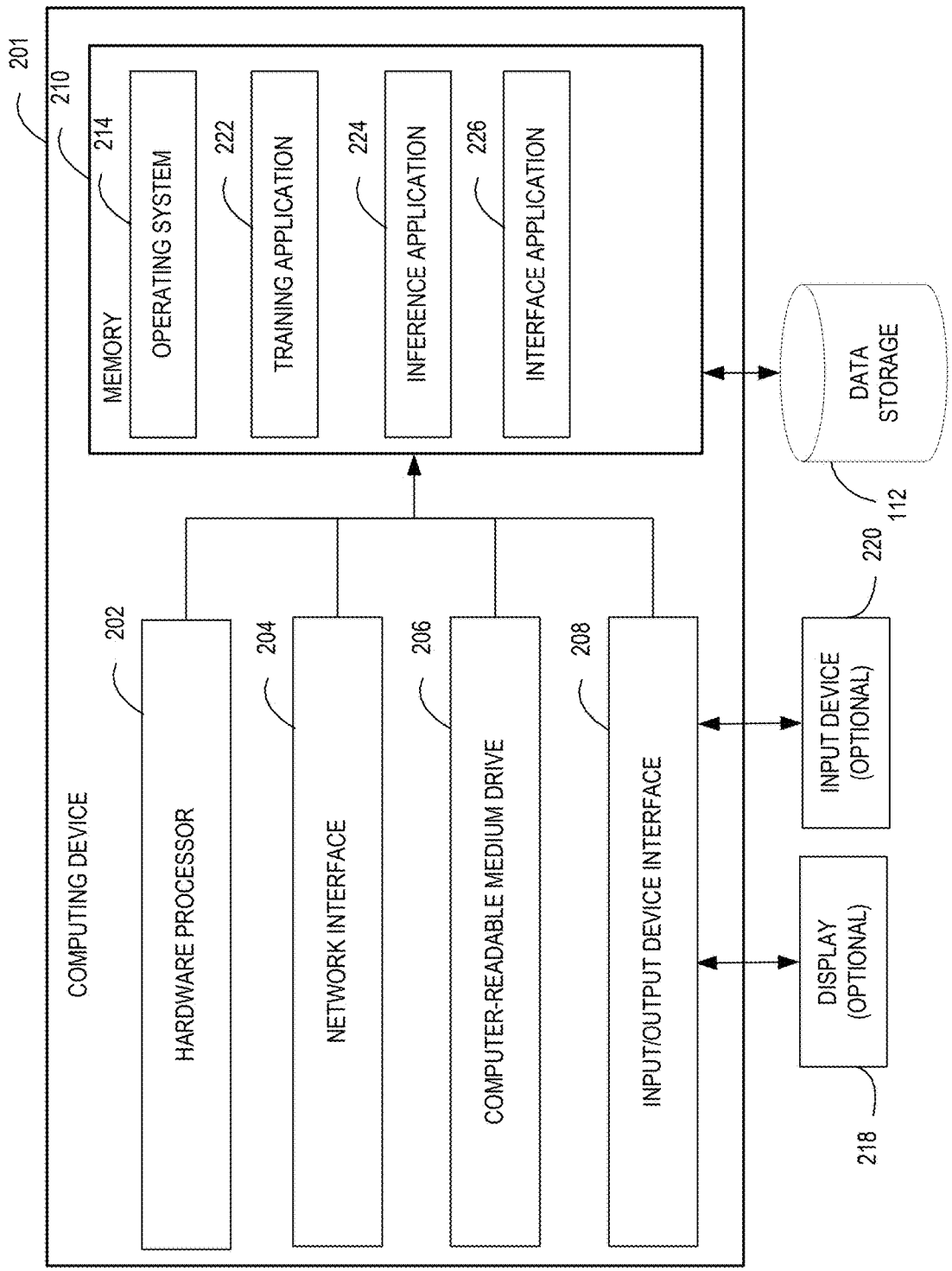
FIG. 2 is a schematic block diagram depicting an illustrative general architecture of a computing device for implementing the detection and enrichment system referenced in the network environment depicted in FIG. 1.

FIG. 2 is a schematic diagram of an illustrative general architecture of a computing device 201 for implementing the detection and enrichment system 104, the security-incident-response system 140, and/or the user facing system 150 referenced in the environment 100 in FIG. 1. The computing device 201 includes an arrangement of computer hardware and software components that may be used to execute the training application 222, the inference application 224, and/or the interface application 226. The general architecture of FIG. 2 can be used to implement other devices described herein, such as the user computing device 102A and/or the agent computing device 102B referenced in FIG. 1. The computing device 201 may include more (or fewer) components than those shown in FIG. 2. Further, other computing systems described herein may include similar implementation arrangements of computer hardware and/or software components.

The computing device 201 for implementing a detection and enrichment system 104 may include a hardware processor 202, a network interface 204, a non-transitory computer-readable medium drive 206, and an input/output device interface 208, all of which may communicate with one another by way of a communication bus. As illustrated, the computing device 201 is associated with, or in communication with, an optional display 218 and an optional input device 220. The network interface 204 may provide the computing device 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the detection and enrichment system 104. The memory 210 generally includes RAM, ROM and/or other persistent or non-transitory computer-readable storage media. The memory 210 may store an operating system 214 that provides computer program instructions for use by the hardware processor 202 in the general administration and operation of the device within the detection and enrichment system 104.

The memory 210 may include a training application 222, an inference application 224, and/or an interface application 226 that may be executed by the hardware processor 202. In some embodiments, the training application 222, the inference application 224, and/or the interface application 226 may implement various aspects of the present disclosure. In some embodiments, data signals can be processed; the training application 222 can train and/or retrain machine learning model(s); the inference application 224 can detect anomalous computer-related activity from the signals; the inference application 224 can also identify co-occurring enrichments, which can include applying the language model(s) 118 to communications data; and/or the interface application 226 can output data associated with the inferences.

Figure 3:
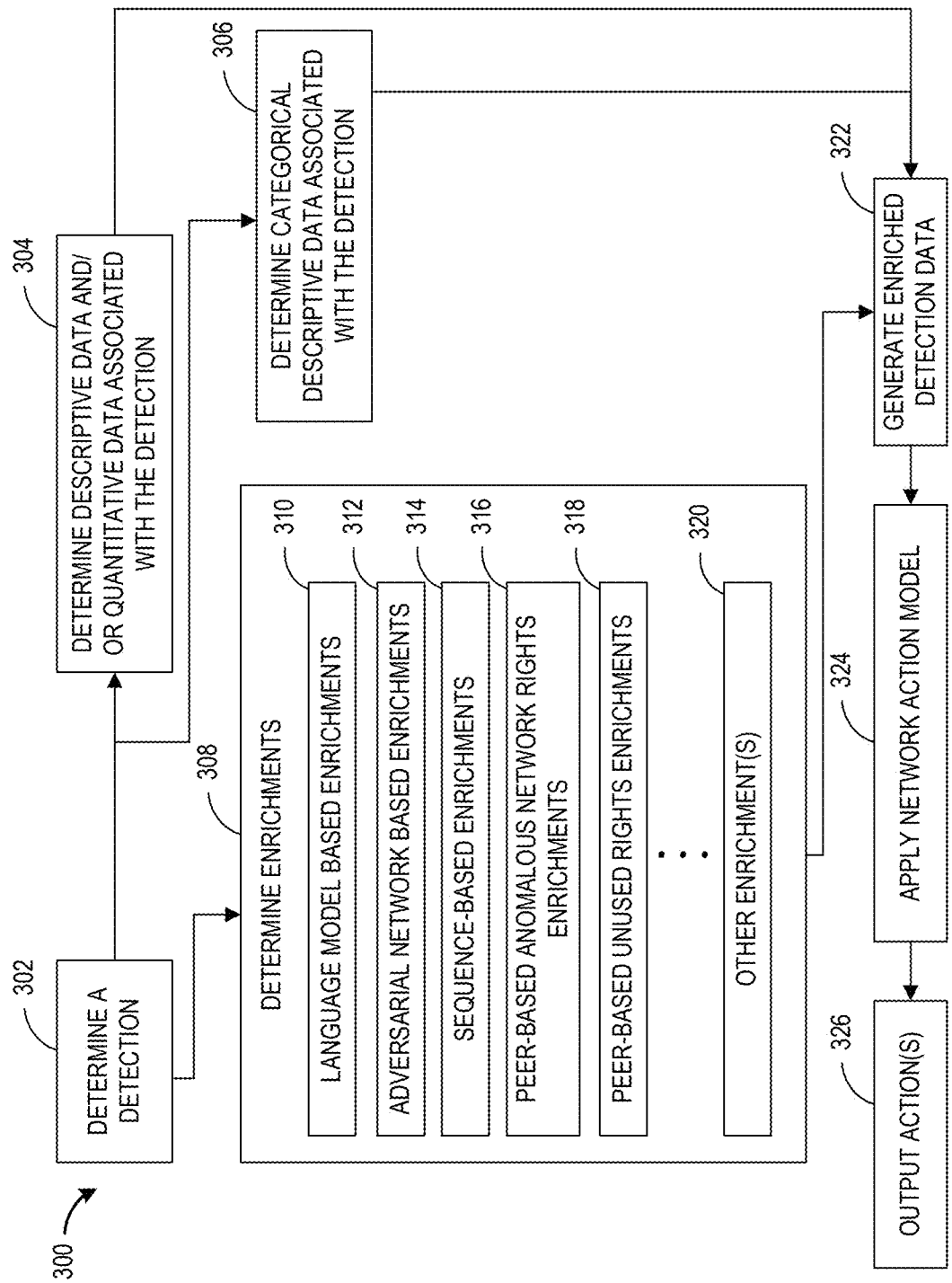
FIG. 3 is a flow chart depicting a method implemented by the detection and enrichment system for determining priority risk indicators.

FIG. 3 includes a flow chart depicting a method 300 implemented by the detection and enrichment system 104 for determining priority risk indicators. As described herein, the detection and enrichment system 104 may be implemented with the computing device 201. In some embodiments, the computing device 201 may include the inference application 224 and/or the interface application 226, each of which may implement aspects of the method 300. Some aspects of the method 300 may be implemented by services of the detection and enrichment system 104, such as the inference service 110 and/or the interface service 114.

Beginning at block 302, one or more detections may be determined. The inference service 110 can determine a detection. The inference service 110 can apply detection logic that can include a threshold to monitor some computer activity. For example, the inference service 110 can detect that an action A was performed (such as a performance of a read operation on a specified database) more than X times during Y timeframe. In some embodiments, the detection and enrichment system 104 may determine contextual data upon detection of anomalous computer-related activity. The contextual data may be used to determine an appropriate action to take (such as an output action), if any, in response to the detection.

At block 304, descriptive data and/or quantitative data associated with the detection may be determined. The detection and enrichment system 104 can extract descriptive data and/or the quantitative data (such as quantitative network data) associated with the detection. For example, when anomalous computer-related activity is detected, the detection and enrichment system 104 can use the type of detection to lookup descriptive data and/or quantitative data relevant to that type of detection. Additionally or alternatively, the detection and enrichment system 104 can determine descriptive data and/or the quantitative data via a machine learning model. If a script has been executed to automate a particular action, triggering a detection, the detection and enrichment system 104 can determine descriptive data, such as, but not, limited to, data indicating a level of network access of the account generating the script, a description of the account, and/or one or more network addresses to which data is written by a profile. As another example, the detection and enrichment system 104 can determine quantitative data for the detection, such as, but not limited to, an amount of data written per hour and/or a statistical measure (such as a Z-score) indicating a relative level of anomalousness of the scripting event relative to other profiles (such as profile peers).

At block 306, categorical descriptive data associated with the detection can be determined. The detection and enrichment system 104 can descriptive data associated with a profile for the detection. The detection and enrichment system 104 can determine categorial descriptive data, such as, but not limited to, a network site associated with the detection, a profile tenure, historical detections associated with the profile and/or detection, and/or an access level associated with the profile. The detection and enrichment system 104 can extract categorical descriptive data associated with the detection. For example, when anomalous computer-related activity is detected, the detection and enrichment system 104 can use the type of detection to lookup the categorical descriptive data that is relevant to that type of detection. Additionally or alternatively, the detection and enrichment system 104 can determine categorial descriptive data via a machine learning model. For example, the inference service 110 can provide detection data (such as X occurrences of Y type occurring within Z amount of time) to a machine learning model to generate the categorical descriptive data.

At block 308, the detection and enrichment system 104 can determine various enrichments 310, 312, 314, 316, 318, 320. The inference service 110 can determine the enrichments 310, 312, 314, 316, 318, 320 co-occurring with the detection. As described herein, the enrichments can include, but are not limited to, gradient-based data and/or qualitative data that associate a profile's actions along a spectrum with respect to other profiles' actions. The list of enrichments 310, 312, 314, 316, 318, 320 are non-exhaustive. Additional enrichments may be developed and deployed within the detection and enrichment system 104.

The inference service 110 can determine language model based enrichments 310. The inference service 110 can use a question answering model to process text data, such as, but not limited to, transcripts or emails associated with a profile in the detection (such as a profile for the agent where anomalous computer-related activity was detected). One example question that can be used by the question answering model is the following: In a yes/no response, did the customer mention an illness, death, injury, or tragedy? This type of question may be representative of a type of social engineering attack. Additionally or alternatively, inference service 110 can apply a language model specifically trained on labelled training data, such as, but not limited to, transcripts or emails with examples of attacks. The inference service 110 can determine a language model based enrichment 310 based on the output of a language model, such as, but not limited to, communications for a profile indicative of an attack that satisfy one or more thresholds (such as a threshold number of detected communications within a period of time).

The inference service 110 can determine various other types of enrichments 312, 314, 316, 318, 320. The inference service 110 can determine adversarial network based enrichments 312. As described herein, the inference service 110 can determine co-occurring adversarial network addresses, phone numbers, and/or other hierarchical data along with a detection. The adversarial network based data can be associated with a profile. Additional details regarding adversarial network based enrichments are described herein, such as with respect to FIG. 8.

The inference service 110 can determine sequence-based enrichments 314. As described herein, the inference service 110 can compare performed anomalous actions associated with a profile over time and can correlate such anomalous actions with unusual hours during which the profile is typically not associated with performing computer activity. The sequence-based enrichment 314 can include gradient-based data, such as a statistical measure. The inference service 110 can determine a statistical measure (such as a Z-score) representing precision of the number of anomalous actions taken by the profile that occurred at odd computer activity hours (for that profile).

The inference service 110 can determine peer-based rights enrichments, such as peer-based anomalous network rights enrichments 316 and/or peer-based unused rights enrichments 318. The inference service 110 can determine a relative level of anomalousness of a profile's rights (such as network database access rights) relative to that profile's peers and/or relative to other profiles that are associated with the same category as the subject profile. The inference service 110 can determine anomalous skills usage and/or may detect unused rights. The inference service 110 can determine supervisory profiles that may themselves not be associated with anomalous activity, but which have reports that are anomalous (such as profiles with anomalous activity reporting to a non-anomalous profile). The inference service 110 can determine a statistical measure (such as a Z-score and/or a standard deviation) representing a relative anomalousness of the profile's rights, anomalous skills usage, and/or unused rights.

The inference service 110 can determine other types of enrichments 320. The other types of enrichments 320 can be based on quantitative data and/or qualitative data. The inference service 110 can determine quantitative type enrichments 320 based at least on, but not limited to, a statistical measure (such as a Z score) related to profile tenure, a statistical measure (such as a Z score) related to historical alarms for a profile, a statistical measure (such as a Z score) related to unique alarms triggered, a statistical measure (such as a Z score) related to concessions provided by a profile, a statistical measure (such as a Z score) related to new profile concession rates, a number of high risk rights that are anomalous for a profile category, and/or data indicating most common events during a logged-in session. The inference service 110 can determine qualitative type enrichments 320 based at least on, but not limited to, data describing rare copy-paste events associated with a profile, email domains associated with concession bias for the profile, unique IP addresses associated with profile logins, geolocation data (such as specific ZIP codes) associated with profile log-ins, a modeled profile category from peer-based anomalous network rights, and/or data identifying other associated profiles (such as grouped with the subject profile) with similar off-hours activity.

At block 322, enriched detection data can be generated. The inference service 110 can aggregate detections with one or more enrichments. In some embodiments, the inference service 110 can aggregate quantitative data and/or qualitative data for an enrichment with detection data, such as, but not limited to, descriptive data, quantitative data, and/or categorical descriptive data for a detection. The detection and enrichment system 104 can store enriched detection data in the data storage 112. Some of the detections may be true positives. A true positive detection is a detection that is actually an unjustified computer-related event or series of events (as opposed to a false positive). The inference service 110 can determine co-occurring (such as temporally related that satisfy a threshold) enrichments with detections for unjustified computer-related activity. As described herein, the inference service 110 can use standard error and/or a confidence band to determine, with a relatively high degree of precision, that particular detections and enrichments are strongly associated with true positives as more cases are considered. The inference service 110 can determine a level of risk of a detection based at least on enriched detection data and a corresponding confidence band.

At block 324, a network action model can be applied. The inference service 110 can use a network action model to sort the detection-enrichment combinations using a lower bound of the corresponding confidence band. In some embodiments, if the lower bound satisfies a threshold (such as 0.9 or some other tunable threshold) a particular action may be automatically taken (such as, but not limited to, disabling network and/or service access for the account, disabling data access, and/or escalating a security ticket). False positives may result from situations where there is insufficient historical data to infer with high confidence that the linear detection-enrichment combination is unjustified computer-based activity. False positive may result in undesirable results, such as automatic, premature profile deactivation. The sorting described herein may allow the precision of a detection-enriched combination to be considered while avoiding/minimizing false positives.

At block 326, one or more actions can be output. In some embodiments, the network action model can be used to determine the appropriate output action for the enriched detection. The network action model can include rule-based logic that may be specific to the various categorical descriptive data, the specific enrichments, and/or the specific detections. The network action model may apply different thresholds to each different type of data. For example, the network action model can compare precision scores output for sequence-based enrichments 314, if provided as part of the enriched detection data for a particular detection, to a precision score threshold. Similarly, other types of enrichments, categorical descriptive data, and/or detections may each be subject to their own respective thresholds. Additionally or alternatively, the network action model may be or include a machine learning model (such as a neural network) that may be trained to predict an output action for the input enriched detection data (such as a feature representation thereof). However, in various other examples, the inference service 110 may use heuristics to determine that enriched detection data corresponds to historical data (such as a past detection event) indicating non-justified account activity and that an output action should be taken. An output action can include or be an automated action. The output action can specify that network access, data access, and/or access to a particular computer-based service for the subject profile may be programmatically disabled and/or modified. The output action can similarly specify that various computer-based operations may be constrained (such as CRUD operations). The network action model can output an overall risk score and/or a recommended remedial action. In some embodiments, the inference service 110 may classify an enriched detection as a particular type of risk and/or may be routed to a particular data repository (associated with the class) and/or escalated between different categories for further investigation.

Figure 4:
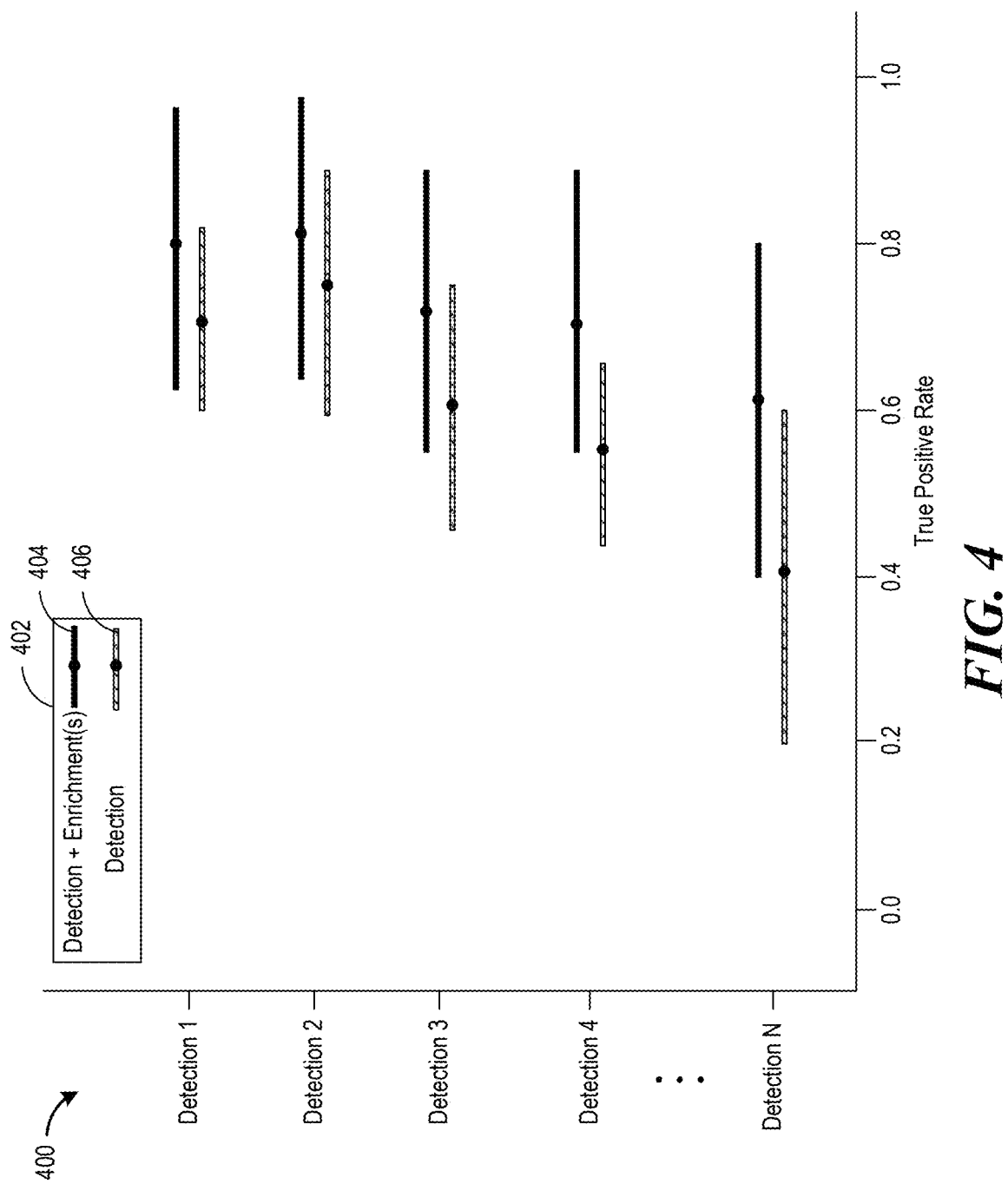
FIG. 4 depicts modeled rates of suspected attacks with and without priority risk indicators.

FIG. 4 depicts a graph 400 with modeled rates of suspected attacks with and without priority risk indicators. As described herein, the detection and enrichment system 104 can model confidences that one or more enrichments predict an attack by tethering prior probabilities of attacks to security and/or incident response investigations. The detection and enrichment system 104 can determine the conditional probability of an attack given a detection (attack|detection) and uncertainty surrounding the probably of an attack. The systems and methods described herein can advantageously determine that the co-occurrence of a detection and one or more enrichments (also referred to herein as a priority risk indicator) is more likely to result in an attack than a detection alone where the probability of an attack given a detection and one or more enrichments (attack|detection+enrichment(s)) is higher than the probability of an attack given a detection (attack|detection) after considering uncertainty.

The detection and enrichment system 104 can model the probability that the co-occurrence of a detection event and an enriched detection event indicate in an attack with Bayesian inference where the probability of an attack updates as more evidence becomes available. In some embodiments, the historical evidence can be from security and/or incident response investigations. If a particular detection and enrichment combination, DE, has been involved in X cases, then the detection and enrichment system 104 can update the posterior probability to reflect this belief. The detection and enrichment system 104 can use Bayes Theorem to model priors and update beliefs, as shown below.

$$P(DE|X) = \frac{P(X|DE)P(DE)}{P(X)}$$

Since Bayes Theorem indicates that the posterior probabilities are proportional to the numerator in the foregoing equation, the foregoing equation can be rewritten with the denominator, as shown below.

$$P(DE|X) \propto P(X|DE)P(DE)$$

As additional security or incident response cases are processed, the detection and enrichment system 104 can update the detection and detection with enrichment(s) true positive rates to converge on their expected value. Higher convergence can advantageously allow greater confidence in the measurement getting closer to its expected value, which can be demonstrated with the law of large numbers theorem in probability theory. In other words, the average of a sequence of random variables sampled from a distribution will converge to the expected value of that distribution.

A detection and enrichment combination can be a subset of a given detection. The quantity of a detection and enrichment combination can often be fewer than the quantity of the detection alone. A detection and enrichment combination can appear to be more indicative of an attack than the detection entirely by chance if there has been little convergence. Thus, ensuring that confidence is proportional to the measurement's state of convergence can be advantageous.

Conclusions from security or incident response cases can yield new posterior distributions. The detection and enrichment system 104 can model confidence of posterior distributions with both detections and detections and enrichment(s) to account for unequal samples. Given a detection with or without enrichments, the quantity of previous cases of attacks determined to be an attack versus not determined to be an attacked can be referred to as attack$_+$ and attack$_-$, respectively. A Beta distribution can refer to a family of continuous probability distributions defined on the interval [0, 1] or (0, 1) in terms of two positive parameters, denoted by alpha (a) and beta (b), that appear as exponents of the variable and its complement to 1, respectively, and can control the shape of the distribution. The detection and enrichment system 104 can use a Beta prior and a Binomial likelihood with observations. With naïve beta priors (a=1, b=1) and a binomial likelihood with observations attack$_+$, N=attack$_+$+attack$_-$, the posterior can be a Beta distribution with parameters a'=1+attack$_+$, b'=1(N−attack$_+$)=1+attack$_-$.

The detection and enrichment system 104 can determine a confidence interval using a Normal approximation of a cumulative distribution function. In probability theory, the cumulative distribution function of a real-valued random variable X, or a distribution function of X, evaluated at x, can be the probability that X will take a value less than or equal to x. The mean of the Beta function can be shown below.

$$\text{attack}_+ = \frac{a'}{(a' + b')}$$

The invariance function can be shown below.

$$\sigma^2 = \frac{a'b'}{(a' + b')^2(a' + b' + 1)}$$

The detection and enrichment system 104 can determine an approximate lower bound solving the following equation for x where (P represents the cumulative distribution for the normal distribution.

$$0.05 = \Phi\left(\frac{(x - \text{attack}_+)}{\sigma}\right)$$

The detection and enrichment system 104 can use an estimation for a standard error function, such as, but not limited to, the below equation where a=1+attack$_+$ and b=1+attack$_-$.

$$\frac{a}{(a + b)} = -1.65\sqrt{\frac{ab}{(a + b)^2(a + b + 1)}}$$

In some embodiments, the expected value of outcomes other than attacks can be modeled. The binary attack$_+$ and attack$_-$ labels can be expanded into additional labels. For example, N-labels can be represented with continuous values between 0 and 1. An analyst can estimate the impact with N=a number (such as 6). No impact, low impact, medium impact, high impact, very high impact, and critical impact can be modeled as n values of 1, 2, 3, 4, 5, and 6, respectively. A detection with n impact can be represented as $$\frac{n}{N}.$$

The detection and enrichment system 104 can use another estimation for a standard error function, such as, but not limited to, the below equation where a=1+S, b=1+N−S, N is the number of detections or detections with enrichments considered, and S is the sum of all impacts represented as $$\frac{n}{N}.$$

$$\frac{a}{(a + b)} = -1.65\sqrt{\frac{ab}{(a + b)^2(a + b + 1)}}$$

The detection and enrichment system 104 can model co-occurring enrichments for a detection and convert the model into a graph network. Each node in the graph network can represent an enrichment and edges join nodes that co-occur at least a threshold number of times, q. The detection and enrichment system 104 can determine cliques in the graph network. In graph theory, a clique, C, in an undirected graph G=(V, E) can be a subset of vertices C⊆V such that all pairs of vertices are adjacent. The detection and enrichment system 104 can determine most occurring cliques until a threshold number of co-occurring enrichments has been identified instead of determining all possible combinations. The detection and enrichment system 104 can raise q until the top n (such as 500) most co-occurring cliques are identified.

The detection and enrichment system 104 can determine posterior attack rates for detections and enrichments from the determined cliques. The detection and enrichment system 104 can determine co-occurring detection and enrichment(s) combinations that satisfy a threshold. For example, the detection and enrichment system 104 can determine detection and enrichment(s) combinations co-occurring at least 5 times (q>=5) with a posterior lower bound attack rate higher than the detection's posterior lower bound and treated as an attack indicator. These attack indicators can be labeled as priority risk indicators. The detection and enrichment system 104 can update the model's priors using the posterior attack rates (such as updating the model's priors daily). Updated priors can allow for novel priority risk indicator identification as evidence is updated and for the deprecation of underperforming priority risk indicators. The detection and enrichment system 104 can determine the confidence intervals/bands from the determined probabilities for detections alone and detection and enrichment(s) combinations.

With respect to FIG. 4, the graph 400 can include a legend 402. The legend 402 indicates a first graphical representation 404 for a confidence band for detection and enrichment(s)

combinations (also referred to herein as a priority risk indicator) and a second graphical representation 406 for a confidence band for a detection alone (without a priority risk indicator). The graph 400 depicts modeled true positive rates of suspected attacks (X axis) by detection type (Y axis). The confidence bands indicate a standard error of attack. As indicated by the legend 402, for each detection type, a confidence band is shown for each detection and enrichment(s) combination and a confidence band for the detection alone. As shown, the determined detection and enrichment(s) combinations are more predictive of potential attacks than the determined detections alone. The lines plotted on the graph 400 represent error confidence bands and the dots represent calculated true positive rates for each error confidence band. As additional historical data corresponding to detections and combinations of detection and enrichment(s) are determined over time, the error confidence bands can shrink (such as where the sample size increases).

Figure 5:
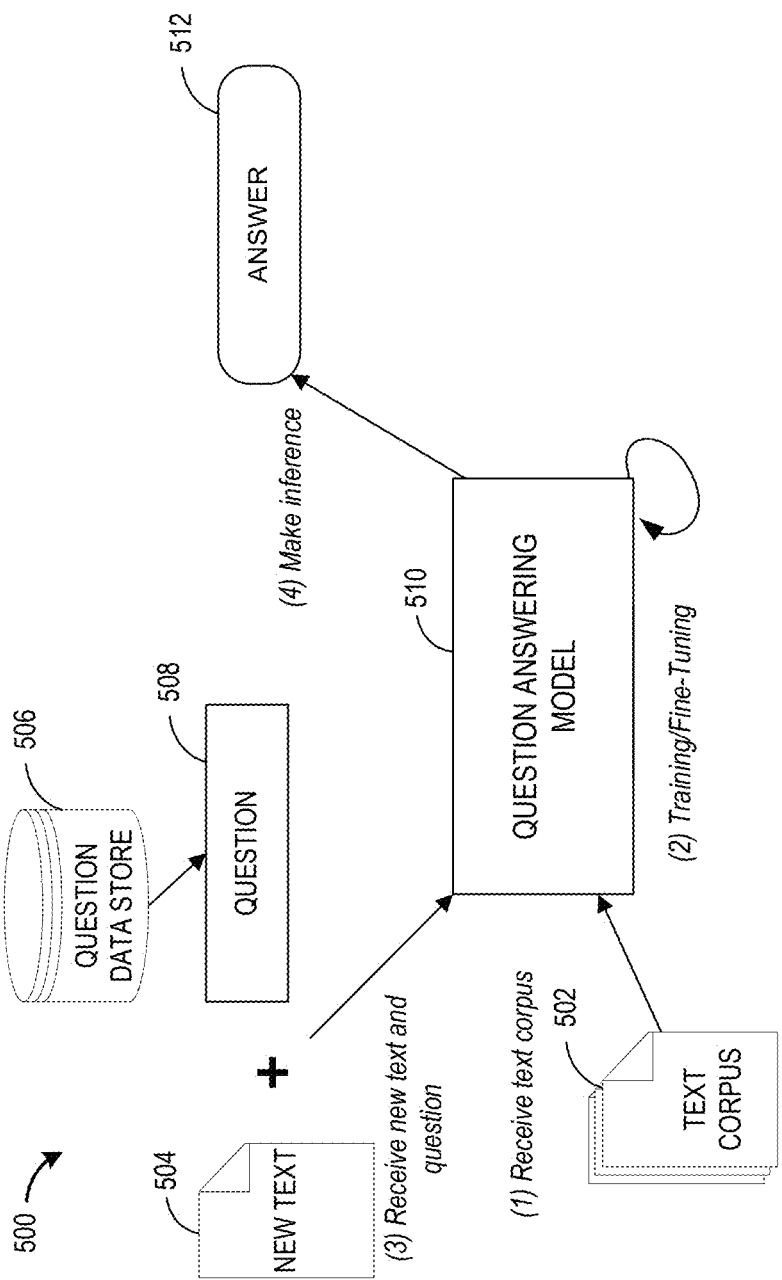
FIG. 5 is a flow diagram depicting illustrative interactions associated with using a question answering model to determine enrichments.

With reference to FIG. 5, in some embodiments, illustrative interactions are depicted regarding using a question answering model to determine enrichments. The environment 500 of FIG. 5 can include a question answering model 510 and a question data store 506. Some components of the environment 100 of FIG. 1 may implement some of the depicted interactions in FIG. 5. The question answering model 510 can be used by the detection and enrichment system 104 to determine a language model based enrichment, such as the language model based enrichment 310 described herein with respect to FIG. 3.

The interactions of FIG. 5 begin at one (1), where a text corpus 502 can be received. The data ingestion service 108 can receive the text corpus 502. In some embodiments, the text corpus 502 can include communications between participant profiles and agent profiles, such as, but not limited to, transcripts via chat or calls and/or email communications. Additionally or alternatively, the text corpus 502 can include text data in the context for which the question answering model 510 will be used to make predictions.

At two (2), the training service 116 can train the question answering model 510. In some embodiments, the question answering model 510 can be pre-trained with generic data for language modeling. In other embodiments, the question answering model 510 can be custom trained. In some embodiments, the training at two (2) can be optional. Training can include fine-tuning. Fine-tuning can refer to an approach to transfer learning where the weights of the pre-trained model are trained on new data. Fine-tuning can be performed on the entire neural network or on only a subset of its layers, in which case the layers that are not being fine-tuned remain the same. In some embodiments, during fine-tuning the learning rate for training can be lowered. The question answering model 510 can include, but is not limited to, a transformer model and/or a large language model (LLM). The question answering model 510 can be, but is not limited to, a pre trained bidirectional encoder representations from transformers (BERT) model or a generative pre-trained transformer (GPT) model. The training service 116 can retrain the question answering model 510 with unsupervised machine learning. Retraining the question answering model 510 can be referred to as transfer learning where a model trained on one task (here general natural language processing) is re-purposed on a second related task (more specific natural language processing). In some embodiments, the training service 116 can retrain the question answering model 510 with supervised or semi-supervised machine learning. The individual text documents from the text corpus 502 can be associated with labels in training data, such as "social engineering" or "not social engineering" or even more specific labels such as "requests password" or "does not request password." The training service 116 can retrain the question answering model 510 with the training data. In some aspects, it can be advantageous to use pre-trained models, since the pre-trained models can have relatively good performance with general natural language processing and/or fine tuning the pre-trained models can be relatively fast with a specific data set, such as the text corpus 502. Moreover, in some aspects, the retrained models can achieve relatively good results with a relatively small training data set, such as a training data set with one hundred true positive examples.

At three (3), new text 504 and a question 508 can be received. The inference service 110 can receive the new text 504 and the question 508. The new text 504 can be similar to text from the text corpus 502 and can include communications between a participant profile and an agent profile, such as, but not limited to, transcripts via chat or calls and/or email communications. For example, the new text 504 can be a transcript of a customer purportedly calling to re-register a mobile device but is instead trying to gain access to the other account. As another example, the new text 504 can be a transcript of a customer asking for concessions on an expensive laptop and the customer (which could be a bot) may be following a script to make money. The inference service 110 can receive the question 508 from a question data store 506. Questions from the question data store 506 can include, but are not limited to, positive-negative questions (such as, yes-no questions), positive-neutral-or-negative questions, open-ended questions, questions that solicit answers in terms of degree, or any other type of question. In some embodiments, questions from the question data store 506 can include open-ended questions. An open-ended question could be: Why did the user call in? Moreover, the questions from the question data store 506 can include, but are not limited to, positive-negative questions. For example: "In a yes/no response, did the agent address the user's problem?" "In a yes/no response, was a threat of violence made?" "In a yes/no response, did the user offer the agent money to perform a job?" "In a yes/no response, did the user ask the agent for a password?" "In a yes/no response, did the user ask to register another account or device?" "In a yes/no response, did the user request to speak with a manager or leadership?" "In a yes/no response, did the user refuse help from the agent?" "In a yes/no response, did the user report a call, email, or text from an entity claiming to be the Company?" "In a yes/no response, did the user ask the agent to speak on a different social media or communications platform?" "In a yes/no response, did the user request the agent for customer data?" "In a yes/no response, did a first user request to cancel an order for a second user?"

At four (4), the question answering model 510 can make an inference. The question answering model 510 can receive input data based on the new text 504 and the question 508. The question answering model 510 can be configured to output an answer 512, such as a positive-negative answer (which could be a yes-no answer), in response to the question 508. Starting with an example question 508: "In a yes/no response, did the user ask an agent for their password?" The question answering model 510, based on the new text 504, such as a transcript, can output an answer 512 of "yes," which can indicate a potential risk of a cybersecurity attack and/or malicious behavior. As another example, the question 508 could be: In a yes/no response, did the user request to speak with a manager or leadership? An advantage of using a pre-trained question answering model is that the question answering model 510, even without the training at two (2), could potentially predict a correct answer 512. For example, some pre-trained question answering model can correctly predict the answer 512 if the new text 504 includes a question from the participant profile to the agent profile asking or requesting that an issue be raised to the CEO of a company since many pre-trained question answering models are capable of such general natural language processing. As described herein, the inference service 110 can use the output from the question answering model 510 to determine enrichments and/or train other machine learning models.

Figure 6:
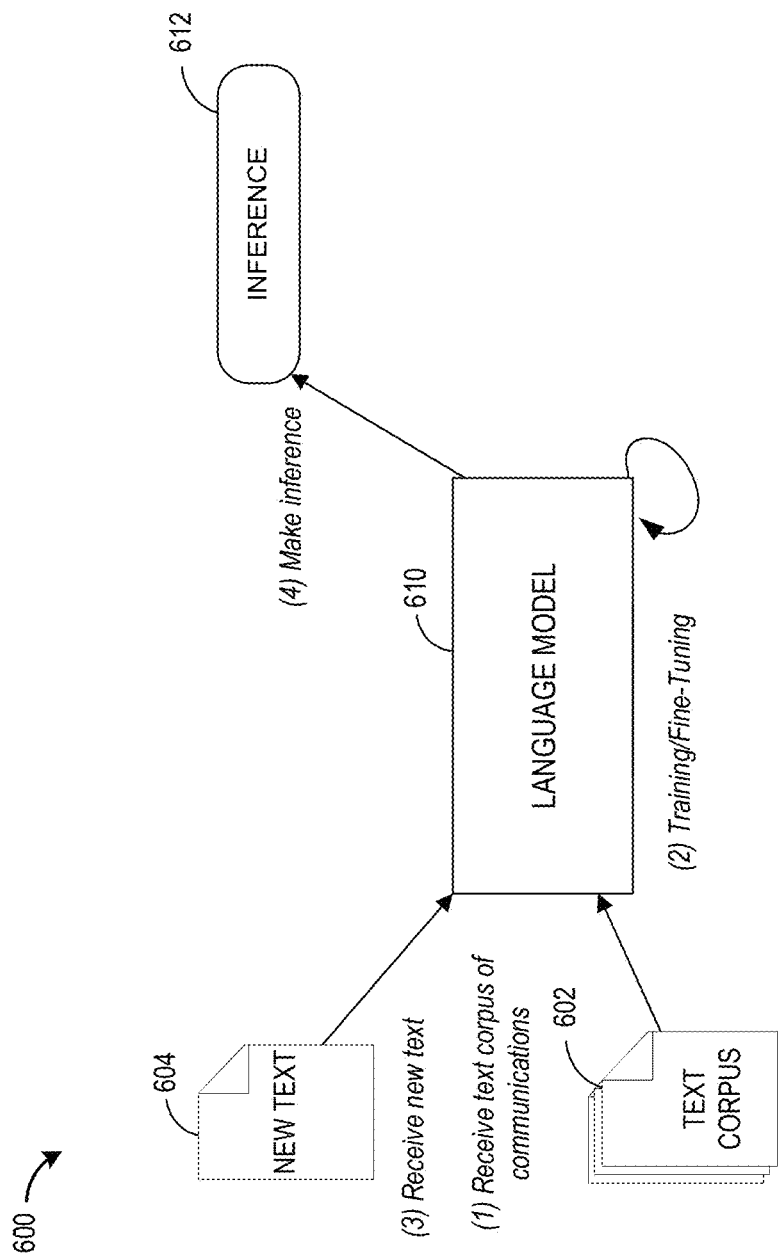
FIG. 6 is another flow diagram depicting illustrative interactions associated with using a language model to determine enrichments.

With reference to FIG. 6, in some embodiments, illustrative interactions are depicted regarding using a language model 610 to determine enrichments. The environment 600 of FIG. 6 can include a language model 610. Some components of the environment 100 of FIG. 1 may implement some of the depicted interactions in FIG. 6. The natural language approach described in FIG. 6 can be a few-shot learning approach instead of a zero-shot question-answering approach described in some embodiments of FIG. 5. Accordingly, the natural language approach described in FIG. 6 can advantageously not require explicit questions but instead the language model 610 can be trained on examples. In other embodiments, the zero-shot question-answering approach described in FIG. 5 can be combined with the few-shot learning approach described in FIG. 6. The language model 610 can be used by the detection and enrichment system 104 to determine a language model based enrichment, such as the language model based enrichment 310 described herein with respect to FIG. 3.

The interactions of FIG. 6 begin at one (1), where a text corpus 602 can be received. The data ingestion service 108 can receive the text corpus 602. In some embodiments, the text corpus 602 can include communications between participant profiles and agent profiles, such as, but not limited to, transcripts via chat or calls and/or email communications. The text corpus 602 can include example indicators of attacks, as described herein, such as, but not limited to, social engineering attacks, requests to speak to a manager or leadership, requests for login information, requests for customer information, etc. The text corpus 602 can include text data in the context for which the language model 610 will be used to make predictions. In some embodiments, the text corpus 602 can be labeled. The labels can be based on the answers 512 from the question answering model 510 as described herein with respect to FIG. 5. In other embodiments, the text corpus 602 may not be labelled.

At two (2), the training service 116 can train the language model 610. As described herein, training can include fine-tuning. In some embodiments, the language model 610 can be pre-trained with generic data for language modeling. In other embodiments, the language model 610 can be custom trained. The language model 610 can include, but is not limited to, a transformer model and/or a large language model (LLM). The language model 610 can be, but is not limited to, a pre-trained BERT model or a GPT model. The training service 116 can retrain the language model 610 with unsupervised machine learning. In some embodiments, the training service 116 can retrain (such as fine-tune) the language model 610 with supervised or semi-supervised machine learning. The training service 116 can use the output from a question answering model 510 as training data to train the language model 610. The individual text documents from the text corpus 602 can be associated with labels in training data, such as "social engineering" or "not social engineering" or even more specific labels such as "requests password" or "does not request password." The training service 116 can retrain the language model 610 with the training data. Depending on the embodiment, the language model 610 can be configured to output a classification or a regression.

At three (3), new text 604 can be received. The inference service 110 can receive the new text 604. The new text 604 can be similar to text from the text corpus 602 and can include communications between a participant profile and an agent profile, such as, but not limited to, transcripts via chat or calls and/or email communications. The new text 604 of FIG. 6 can be similar to the new text 504 of FIG. 5.

At four (4), the language model 610 can make an inference 612. The language model 610 can receive input data based on the new text 604. As described herein, the language model 610 can be configured to output a classification or a regression. The language model 610 can output a classification (such as a yes or a no) that the new text 604 is indicative of an attack. The language model 610 can output a regression value (such as a value between 0 and 1) that indicates a likelihood of an attack or a different type of likelihood, such as a predicted severity of impact. As described herein, the inference service 110 can use the output from the language model 610 to determine enrichments.

Figure 7:
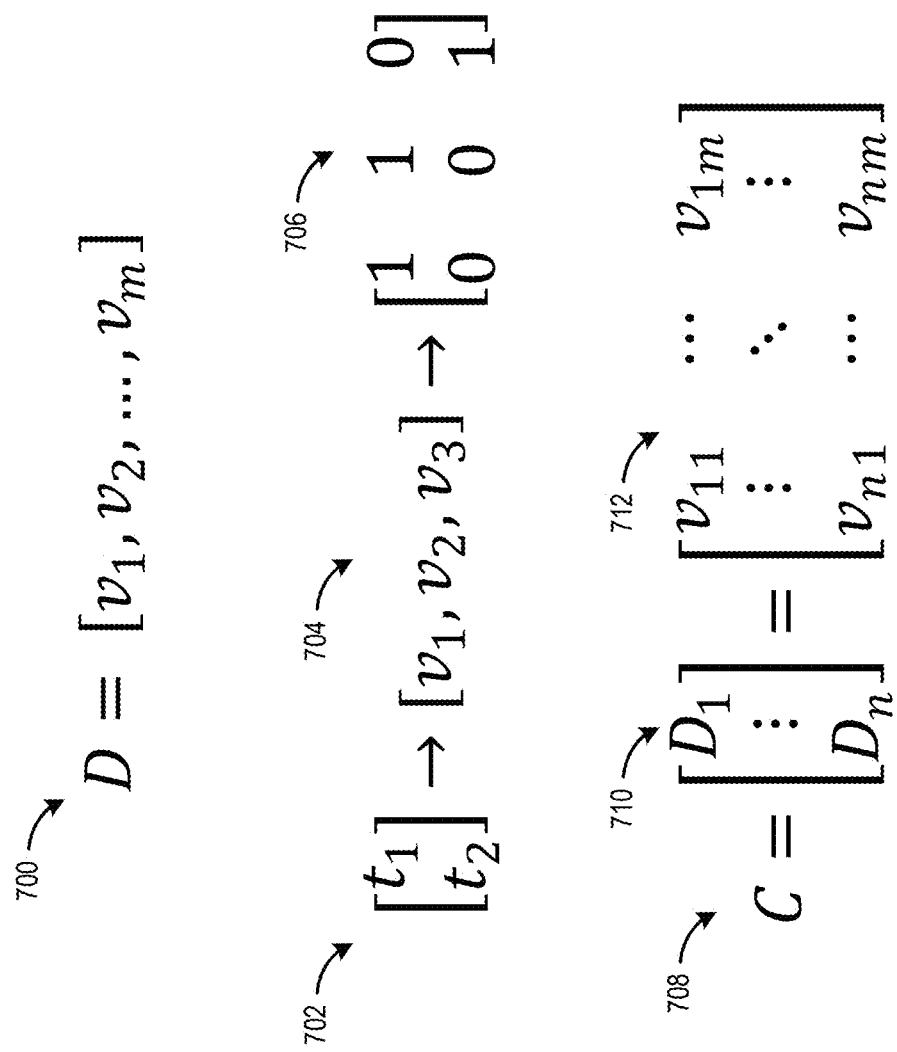
FIG. 7 is a diagram depicting illustrative vector representations of language model results.

FIG. 7 is a diagram depicting illustrative vector representations of language model results. The language models described herein can be used to approximate communications between agent profiles and user profiles, which can be referred to as a disposition. Moreover, the results of the language models can be used to determine enrichment, as described herein. As shown, the disposition D 700 can represent a vector of m language models $[v_1, v_2, \ldots, v_m]$.

Each language model can receive text input and output a result. In some embodiments, the output of the language model can be represented with a binary value. For example, each model of the vector $[v_1, v_2, v_3]$ 704 can be tuned to identify a death/illness/injury/tragedy, a request for money, and escalations to leadership, respectively. Each model of the vector $[v_1, v_2, v_3]$ 704 receives the input $$\begin{bmatrix} t_1 \\ t_2 \end{bmatrix}$$

702, which are different text documents representing respective communications. In the example, $t_1$ can represent a first transcript document where there is a description that the user's relative is in the hospital and the user is requesting a refund on an item; $t_2$ can represent a second transcript document where the user asks to speaker with the agent's manager.

Accordingly, the first row of the first matrix $$\begin{bmatrix} 1 & 1 & 0 \\ 0 & 0 & 1 \end{bmatrix}$$

706 represents that (i) the first model $v_1$ (which can be configured to identify death/illness/injury/tragedy text) and the second model $v_2$ (which can be configured to identify request-for-money text) each indicate respective anomalous computer-related activity associated with the first transcript document $t_1$ (which can include the text description that someone's relative is in the hospital and the user is requesting a refund on an item); and (ii) the third model $v_3$ (which can be configured to identify escalations-to-leadership text) does not indicate a respective anomalous computer-related activity associated with the first transcript document $t_1$. Conversely, the second row of the first matrix $$\begin{bmatrix} 1 & 1 & 0 \\ 0 & 0 & 1 \end{bmatrix}$$

706 represents that (i) the first model $v_1$ (which can be configured to identify death/illness/injury/tragedy text) and the second model $v_2$ (which can be configured to identify request-for-money text) each do not indicate respective anomalous computer-related activity for the second transcript document $t_2$ (which can include the text description where the user asks to speaker with the agent's manager); and (ii) the third model $v_3$ (which can be configured to identify escalations-to-leadership text) indicates a respective anomalous computer-related activity for the second transcript document $t_2$.

Each model of the vector $[v_1, v_2, v_3]$ 704 can be trained with a few-shot training method and/or a zero-shot method. In other embodiments, each model of the vector $[v_1, v_2, v_3]$ 704 can be the same language model, except that each model can receive a different question prompt. In yet further embodiments, each model of the vector $[v_1, v_2, v_3]$ 704 may be trained with a few-shot method based on different types of attack examples and each model may not be associated with a specific category of attack.

A corpus C 708 can represent a vector of dispositions $$\begin{bmatrix} D_1 \\ \vdots \\ D_n \end{bmatrix}$$

710 containing n transcripts and m language models. The corpus C 708 can be for a particular time period, such as a day, week, month, etc. The corpus C 708 can be for (i) a particular user profile or agent profile or (ii) multiple user profiles and agent profiles. The corpus C 708 can further be represented with a vector of vectors, namely, the matrix $$\begin{bmatrix} v_{11} & \cdots & v_{1m} \\ \vdots & \ddots & \vdots \\ v_{n1} & \cdots & v_{nm} \end{bmatrix}$$

712, which can reflect the output of each of the m language models and the n transcripts. As described herein, the inference service 110 can process the matrix 712 with various operations, such as a group by operation that determines whether any particular text document is indicative of any attack and/or a group by operation that determines whether any set of text documents are indicative of a particular type of attack.

Figure 8:
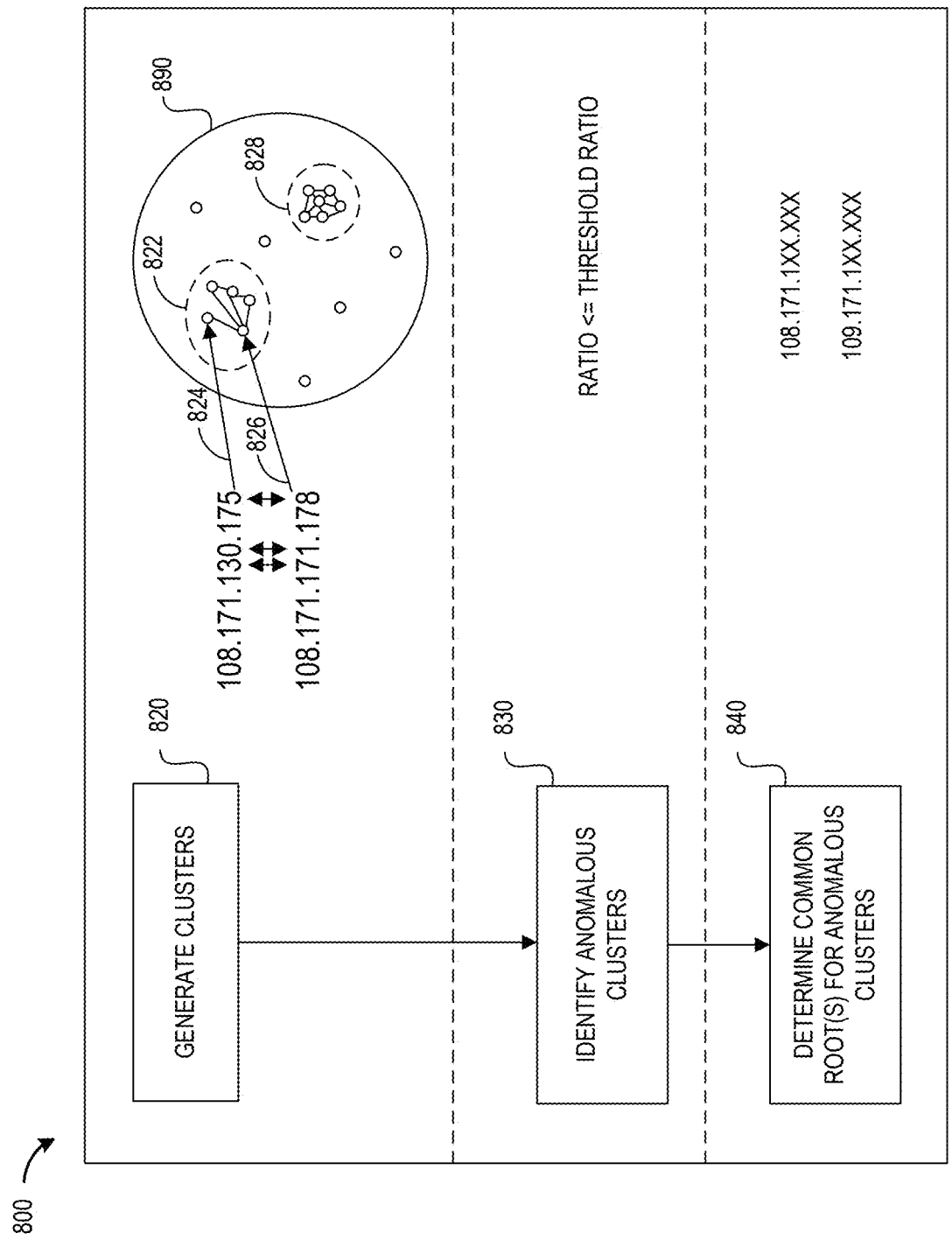
FIG. 8 is a flow chart and diagram depicting a method implemented by the detection and enrichment system for determining adversarial network based enrichments.

FIG. 8 is a flow chart and diagram depicting a method 800 implemented by the detection and enrichment system for determining adversarial network based enrichments. FIG. 8 includes a flow chart depicting a method 800 implemented by the detection and enrichment system 104 and a diagram for determining adversarial network based enrichments. As described herein, the detection and enrichment system 104 may be implemented with the computing device 201. In some embodiments, the computing device 201 may include the inference application 224 and/or the interface application 226, each of which may implement aspects of the method 800. Some aspects of the method 800 may be implemented by services of the detection and enrichment system 104, such as the inference service 110 and/or the interface service 114. The method 800 can output or result in gradient-based data indicating anomalous networks associated with a particular profile. In some embodiments, the method 800 can provide data as an input to the detection and enrichment system 104. The method 800 can determine an adversarial network based enrichment, such as the adversarial network based enrichment 312 described herein with respect to FIG. 3. The gradient-based data may be used to enrich a linear detection, as described herein.

Perpetrators of cyber-attacks continually attempt to modify their behavior and/or the characteristics of their attacks in order to avoid detection. Attackers can modify identifiers in order to mask the identity of the attacker and/or to make the attacks appear as though they are legitimate requests. For example, attackers can modify phone numbers, internet protocol (IP) addresses, geo-location data, and/or other hierarchical data representations associated with attacks in order to circumvent cyber-attack prevention measures.

In an example of such attacks, some online services provide a "click to call" service (or other call-back service) whereby users can provide a telephone number and may request a call from the online service (such as for technical support) using a graphical user interface provided by the online service. However, some attackers have set up premium phone numbers that charge the online service a fee every time the phone number is called. The attackers may set up automated systems whereby they make a large volume of click-to-call requests causing the click-to-call service to call premium phone numbers in order to attempt to defraud the organization providing the click to call service. In order to try to avoid detection filters, the attackers can modify the IP addresses used to make such requests and/or the premium phone numbers themselves over time such that it appears as though different, legitimate IP addresses and/or phone numbers are being used, when in reality the IP addresses and/or phone numbers are part of the same cyber-attack scheme.

Aspects of embodiments disclosed herein, can be based on the observation that modification of IP addresses and phone numbers (and more generally modification of any hierarchical data representations) to avoid detection typically preserves large proportions of the original sequence—typically modifying only a few numbers. Accordingly, accounts that are associated with large IP/phone number pools generally have several clusters with very similar sequences. Traditional means of determining similarity in a feature space often include determining a Euclidean and/or cosine distance between data points. However, Euclidean distance determination is extremely sensitive to the position of a changing value within numbers. For example, the Euclidean difference between the numbers 1,000 and 1,001 is relatively small, but the Euclidean difference between the numbers 9,000 and 1,000 is much larger, despite only a single digit being changed in each of the two examples.

In some embodiments, the detection and enrichment system 104 can treat hierarchical data representations (such as phone numbers, IP addresses, geolocation coordinates, etc.) as strings, and a distance between any two strings may be represented by the number of "edits" or "substitutions" between the two strings. For example, the strings "Brendan" and "Brandon" may be 2 edits apart and the phone numbers (555) 555-6161 and (555) 555-6999 may be 3 edits apart. The detection and enrichment system 104 can determine the number of edits or substitutions between two strings, which can be referred to as determining the Levenshtein distance between two strings/numbers.

At block 820, clusters can be generated. The inference service 110 can generate clusters from requests. The detection and enrichment system 104 can receive multiple requests. The requests may be requests to access a computing service, a click-to-call service, acquisition requests, support requests, and/or any type of request that may be made over a communications network. The inference service 110 can receive the requests and can determine hierarchical data representations associated for each request. The hierarchical data representations may be any hierarchical representation of data, such as, but not limited to, telephone numbers, IP addresses, geolocation coordinates, etc. Hierarchical data representations represent some hierarchy of data. For example, in an IP address, the first sequence of bits (e.g., the first octet in IPv4) can represent a network, while the final bits (such as the final, right-most octet) can represent an individual node. The middle two octets of an IP address can represent sub-networks. Similarly, in phone numbers, the first digits (such as the left-most digits) typically represent the highest category of geographic locations (such as country codes), while the next level of digits may represent an area code. In some cases, the following digits may represent a city and/or a portion of a city, etc. The inference service 110 can represent each request as a node in a graph network.

For example, the inference service 110 can receive a first request that includes a first source IP address 108.171.130.175. The inference service 110 can represent the first request as a first node 824 in a feature space 890. Similarly, the inference service 110 can receive a second request that includes a second source IP address 108.171.171.178. The inference service 110 can represent the second request as a second node 826 in the feature space 890. The inference service 110 can determine the number of value substitutions/differences/additions/deletions between the first request and the second request. As shown by the arrows between the IP addresses 108.171.130.175 and 108.171.171.178 in FIG. 8, there are 3 value substitutions between the IP address of the first request and the IP address of the second request (such as a Levenshtein distance of 3). The inference service 110 can compare the number of value substitutions/differences (such as the Levenshtein distance). The threshold value can be a tunable parameter that may be manually selected and/or determined based on data representing a corpus of nodes (such as based on training data used to train a machine learning model that outputs an appropriate threshold value based on current and/or historical conditions). In an example, the threshold number of value substitutions may be 4. If two nodes (such as two hierarchical data representations) have a distance that satisfies a threshold, the inference service 110 can connect the nodes in the feature space 890.

In the current example, there are three substitutions between the IP address of node 824 and the IP address of node 826. Accordingly, the number of substitutions is less than the threshold and the nodes are clustered together into a first cluster 822. In the example depicted in FIG. 8, other nodes are clustered together in a second cluster 828. In the example, the inference service 110 connects two nodes in the cluster if the number of value substitutions between the two nodes is less than or equal to (or simply less than in other embodiments) the threshold number.

At block 830, an anomalous cluster can be identified. The inference service 110 can identify a cluster as anomalous based on one or more thresholds. The inference service 110 can determine, for each cluster, a ratio of a quantity of unique profile identifiers to the quantity of nodes. The inference service 110 can determine the profile identifier(s) associated with each node of the cluster 822, 828. The inference service 110 can receive profile identifiers (or other identifying data) as metadata along with the service request, which can be a result of a user logging in prior to requesting the service. In some embodiments, the inference service 110 can treat requests that are not associated with any profile identifier (or other identifying data) as emanating from a single entity. The inference service 110 can compare the determined ratio (such as the ratio of unique profile identifiers to the number of requests/nodes in a cluster) to a threshold ratio. If the ratio is less than the threshold ratio (or less than or equal to depending on the implementation), the inference service 110 can mark the cluster as anomalous for enriched detection purposes. In some embodiments, the inference service 110 can designate clusters as anomalous when a threshold for number of connected nodes/requests is satisfied during a particular time period. For example, the inference service 110 can designate a cluster as anomalous where greater than or equal to 10 (or any other suitable number) requests have been received within the past 3 minutes. As described herein, determination of anomalous clusters by the inference service 110 can be an enriched detection.

The inference service 110 can determine clusters of requests with hierarchical data representations that are similar to one another (such as similar as determined by Levenshtein distance) and that are received within a period of time (such as 5 minutes, 10 minutes, or some other suitable time period). The inference service 110 can designate the clusters of requests as anomalous if the determined ratio satisfies a threshold (such as the ratio of the number of unique profiles associated with the requests to the number of requests in the cluster is less than a threshold ratio, such as 0.85, 0.9, or some other threshold ratio). In some cases, valid requests made during a relatively short time period tend to have a 1-to-1 correspondence between the number of unique user profiles making the requests and the total number of requests in a given cluster. Accordingly, if the ratio is significantly less than 1.0 there is a higher likelihood that the cluster of requests are related to an attack.

In an example, there may be 20 nodes in a cluster (representing 20 separate requests for a service). Among the 20 nodes, 10 may be associated with a single profile identifier and 5 may not be associated with any profile identifier. Each of the remaining 5 nodes may be associated with their own, respective profile identifiers. Accordingly, in the current example the ratio=(1+1+5)/20=7/20=0.35. In the current example, the threshold ratio can be 0.65 (although any suitable value may be used). Since the calculated ratio is less than the threshold ratio, the inference service can designate the cluster as anomalous. In some embodiments, the ratio determined at block 830 can be a gradient-based, adversarial network based enrichment. For example, the ratio may be used as some indication that networks associated with a particular profile may be adversarial in nature.

At block 840, common root(s) for anomalous clusters can be determined. The inference service 110 can determine common root(s) of the hierarchical data representations of nodes in a cluster denoted as anomalous. The inference service 110 can determine common root(s) as the ordered values in the hierarchical data representations that are shared among the nodes of the anomalous cluster. For example, a subset of IP addresses associated with an anomalous cluster may have the same values for the first 3 octets of the IP addresses (such as all nodes may be 192.141.8.XXX). In some embodiments, the detection and enrichment system 104 can cause any new requests that are received with IP addresses that match a common root to be prevented from accessing the requested service, such as the IP addresses associated with the adversarial network represented by the anomalous cluster. The IP addresses can be blocked for a specified period of time in order to avoid blocking legitimate service requests. For example, an IP address may be blocked by preventing and/or denying access to the requested service. Similarly, in some examples, anomalous clusters may be defined for a particular period of time to avoid static definitions of adversarial networks. Further, as described in further detail herein, various techniques may be implemented to avoid and/or limit the number of false positives (such as the blocking of a legitimate request). Blocked nodes (such as blocked IP addresses, phone numbers, etc.) may be added to a list that may be prevented from accessing the particular service for a limited period of time (such as 30 minutes, 1 hour, 1 day, etc.).

Each IP address can include a set of ordered numbers (such as 4 octets). The common root may be the set of ordered numbers common to a subset of nodes of the anomalous clusters (or to all nodes of the anomalous cluster). For example, all the IP addresses associated with at least some nodes of the first cluster 822 may include the same values for the first 2 octets—108 and 171, respectively. Similarly, the third octet, when expressed in decimal notation, may have three digits and all nodes may have a 1 as the first digit, although the remaining two digits may differ among the different nodes. Accordingly, in decimal form, the common root for cluster 822 may be 108.171.1XX.XXX with the Xs representing variable, generic values. Although in the foregoing example, the common root comprises only contiguous values within the decimal representation of the IP addresses, in at least some examples, the common values need not be contiguous. In some examples, data at higher hierarchical levels representing more general data (such as the first octet and/or first two octets of an IP address and/or the area code of a telephone number) may be disregarded for purposes of determining the common root(s). For example, there may be a single substitution between the IP address 108.171.130.175 and the IP address 109.171.130.175. However, since this substitution occurs in the first octet (such as replacing the "8" with the "9"), this substitution may be ignored. In the example, the common roots for this example cluster may be determined to be any IP address beginning with 108.171.XXX.XXX or 109.171.XXX.XXX, as the first two octets may be disregarded.

In some embodiments, the detection and enrichment system 104 can cause incoming requests to be blocked (such as preventing access to one or more services) associated with the common root. For example, a new request may be from IP address 108.171.143.170 that includes the previously determined common root 108.171.1XX.XXX. Accordingly, the new request can be blocked. In some embodiments, to avoid blocking legitimate requests, requests may be only if they are received within a threshold amount of time from designation of a cluster as anomalous. Additionally or alternatively, incoming requests can be blocked if they are a threshold distance (such as a Levenshtein distance) from any of the common roots.

In some embodiments, a hierarchical data representation on a blocked list may be monitored to determine if any of the blocked addresses are associated with a false positive. For example, if a particular IP address attempts to access the service through a different channel (such as email as opposed to a call-back service) the blocking of the IP address may be determined to be a false positive. In an example, if the number of false positives on the blocked list is above a certain percentage, an alert may be triggered and the blocked list may be evaluated by a human evaluator. In another example, a false positive that is incorrectly blocked from accessing a service may be granted access to the service after the blocked list expires (such as after 30 minutes, etc.). However, a blocked list's tenure may be renewed, extending the expiration time, if the potentially adversarial address(es) continually attempt to request the service.

Figure 9:
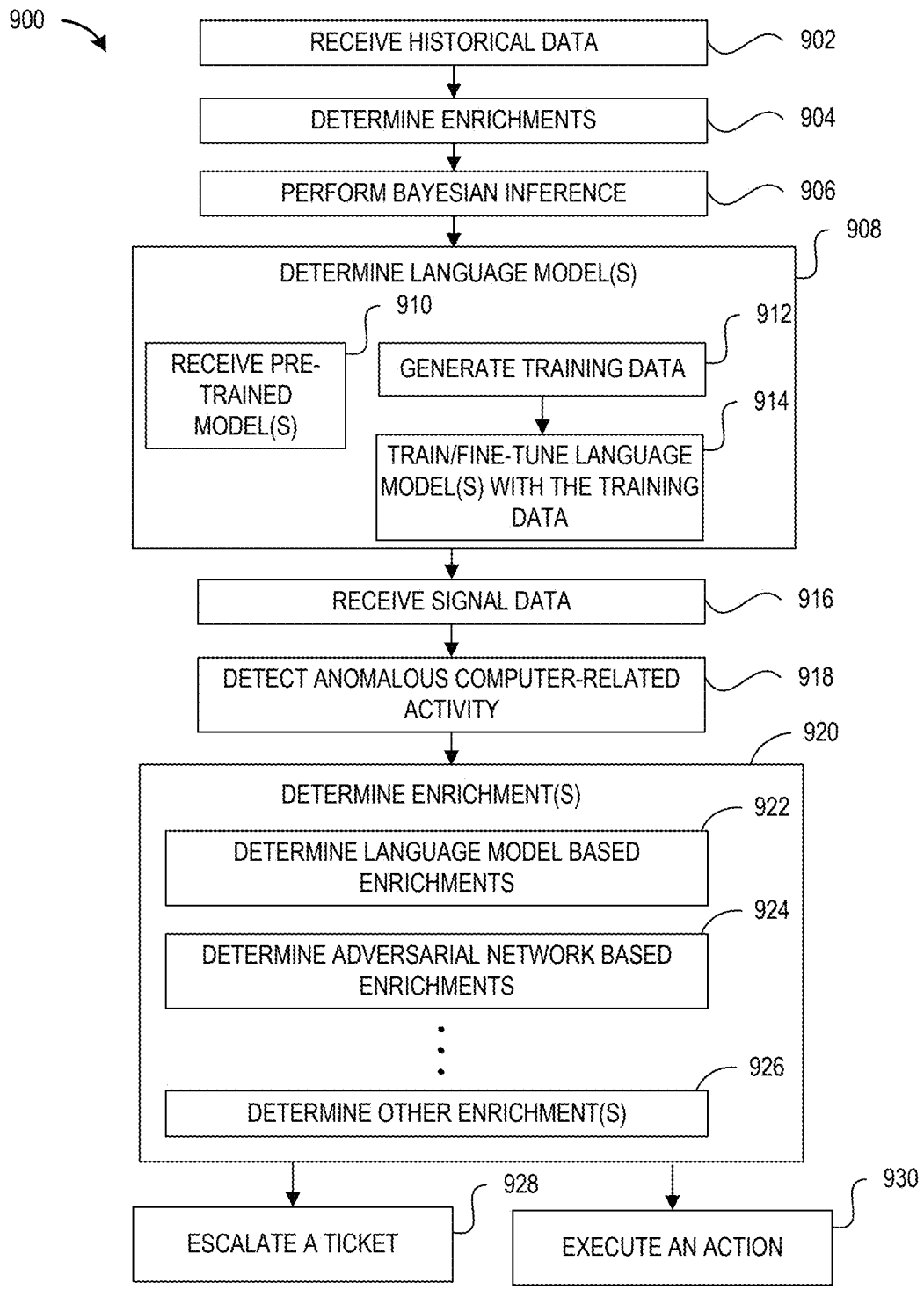
FIG. 9 is another flow chart depicting a method implemented by the detection and enrichment system for determining priority risk indicators.

FIG. 9 includes a flow chart depicting another method 900 implemented by the detection and enrichment system 104 for determining priority risk indicators. As described herein, the detection and enrichment system 104 may be implemented with the computing device 201. In some embodiments, the computing device 201 may include the training application 222, the inference application 224, and/or the interface application 226, each of which may implement aspects of the method 300. Some aspects of the method 300 may be implemented by services of the detection and enrichment system 104, such as the training service 116, the inference service 110, and/or the interface service 114.

Beginning at block 902, historical data can be received. The data ingestion service 108 can receive historical data. In some embodiments, the data ingestion service 108 can receive historical data from the security-incident-response system 140. The historical data can include investigations data from a security operations center and/or an incident response team. The historical data can also include historical signal data. The historical data can indicate detections of anomalous computer-related activity, enrichments, cases where an attack was suspected (such as where an analyst concluded an attack occurred), and/or cases where an attack was not suspected (such as where an analyst concluded an attack did not occur).

At block 904, co-occurring enrichments can be determined. The inference service 110 can determine enriched detection events co-occurring with detection events from the historical data, such as the historical signal data. The inference service 110 can process the historical data to determine detections of anomalous computer-related activity, such as a read operation on a specified database. The inference service 110 can determine enriched detection events that are co-occurring with the detection, such as, but not limited to, output from a language model indicating suspicious behavior, indicators of suspicious network requests, etc.

The inference service 110 can determine different combinations of detection events co-occurring with enriched detection events. The inference service 110 can determine detection events from the historical data. The inference service 110 can generate a graph network, where each node from the graph network can be associated with an enriched detection event and an edge between two nodes corresponds to co-occurring enriched detection events. Each node in the graph network can represent an enrichment and edges join nodes that co-occur at least a threshold number of times, q. The inference service 110 can identify, from the graph network, a clique satisfying a threshold. As described herein, a clique, C, in an undirected graph G=(V, E) can be a subset of vertices C S V such that all pairs of vertices are adjacent. The inference service 110 can raise q until the top n (such as 500) most co-occurring cliques are identified. The inference service 110 can model the determined combinations of co-occurring detection events and enriched detection events (which the inference service 110 can derive from the determined cliques). Additional details regarding determining cliques are described herein, such as with respect to FIG. 4.

At block 906, a Bayesian inference can be performed. The inference service 110 can perform a Bayesian inference to model the likelihood that a co-occurrence of a detection event and enriched detection event(s) indicate an actual attack. A detection event can be associated with a detection event type and an enriched detection event can be associated with an enriched detection event type. The inference service 110 can calculate, from historical data, a first quantity of detection events of the detection event type without an enriched detection event of the enriched detection event type. The inference service 110 can calculate, from the historical data, a second quantity of detection events of the detection event type co-occurring with a respective enriched detection event of the enriched detection event type. The inference service 110 can determine, from the first quantity of detection events and the second quantity of detection events, that a first likelihood of a suspected attack given any detection event of the detection event type co-occurring with the respective enriched detection event is higher than a second likelihood of any detection event of the detection event type without the enriched detection event. The inference service 110 can determine the likelihood of an attack given a detection and one or more enrichments (attack|detection+enrichment(s)) is higher than the likelihood of an attack given a detection alone (attack|detection). Thus, the inference service 110 can determine which co-occurring detection events and enriched detection events to use as priority risk indicators. Additional details regarding using Bayesian inference to determine likelihoods are described herein, such as with respect to FIG. 4.

In some embodiments, the same enriched detection event type can be associated with different threshold values. For example, in the case of language model based enriched detection event types, the inference service 110 can aggregate language model results by period of time (such as less than ten days, less than twenty days, less than thirty days, etc.), by quantity (such as greater than 1, 3, 5, 10, 20 communications with a certain label), and/or by percentage (such as greater than 0%, 2.5%, 5.0% of communications with a certain label). The different threshold values can determine whether the inference service 110 indicates the presence of an enriched detection event type or not. The inference service 110 can model each of the co-occurring enriched detection event types with different threshold values to determine those enriched detection events with threshold values that have a higher likelihood of indicating an actual attack. The inference service 110 can calculate, from historical data, a first likelihood of a first suspected attack given any detection event of the detection event type co-occurring with any enriched detection event of the enriched detection event type satisfying the first threshold value. The inference service 110 can calculate, from the historical data, a second likelihood of a second suspected attack given any detection event of the detection event type co-occurring with any enriched detection event of the enriched detection event type satisfying a second threshold value. The inference service 110 can select the first threshold value instead of the second threshold based at least in part on the first likelihood being more likely than the second likelihood.

At block 908, one or more language models can be determined. The detection and enrichment system 104 can determine one or more language models. Determining language models can include the execution of the blocks 910, 912, 914, some of which may be optional depending on the embodiment. At block 910, the detection and enrichment system 104 can receive a pre-trained model. In some embodiments, the pre-trained model can be or include a question answering model. Additional details regarding a question answering model are provided herein, such as with respect to FIG. 5. The pre-trained model can include or be a transformer model. As described herein, the pre-trained models can include, but not limited to, a pre-trained BERT model or a pre-trained GPT model. A question answering model can refer to machine or deep learning models that can answer questions given some context. Some question answering models can answer questions without any context. Some question answering models can extract answer phrases from text, paraphrase the answer generatively, and/or choose one option out of a list of given options.

At block 912 training data can be generated. The training service 116 can generate training data from questions, communication text data, and/or labels. Questions can include, but are not limited to, positive-negative questions, positive-neutral-or-negative questions, open-ended questions, and/or questions that solicit answers in terms of degree. As described herein, the questions can relate to determining some kind of attack, such as questions related to cybersecurity and/or social engineering attacks. Some non-limiting questions are provided herein. In some embodiments, labels can be human generated or partially human generated. For example, human analysts or the agents themselves can tag transcripts with one or more labels. Additionally or alternatively, the labels can be received from a machine learning model, as described herein.

At block 914, one or more language models can be trained. As described herein, some types of training can include fine-tuning. The training service 116 can retrain a pre-trained language model with supervised machine learning and the training data set comprising a text corpus and a label. The retraining described with respect to the present block 914 and throughout the specification can include fine-tuning. The training service 116 can retrain one or more question answering models. The training service 116 can retrain the pre-trained language model(s) with a text corpus. The training service 116 can output retrained language model(s). The training service 116 can retrain the pre-trained language model(s) with use case specific data, such as text data used by the groups that use the user facing system 150. The training service 116 can retrain the one or language models with unsupervised machine learning. Additionally or alternatively, the training service 116 can retrain the one or language models with semi-supervised or supervised machine learning. For example, the training data can include text data (such as a text corpus), question(s), and labels, and the language models can be retrained with the training data. In some aspects, it can be advantageous to use pre-trained models, since the pre-trained models can have relatively good performance with general natural language processing and/or fine tuning the pre-trained models can be relatively fast with a relatively small use case specific data set. The language model can be trained to detect at least one of (i) a potential cybersecurity attack or (ii) a potential social engineering attack. Additional details regarding training language models are described herein, such as with respect to FIG. 6.

In some embodiments, the trained language model can be a fine-tuned machine learning model/a question answering model. As described herein, some pre-trained natural language processing models can be available in different sizes, use different amounts of computing memory, and/or can have different performance metrics. For example, some pre-trained natural language processing models can be offered in a small size (such as approximately 200 MB), a medium size (such as approximately 900 MB), a large size (such as approximately 3 GB), an extra-large size (such as approximately 11 GB), an extra-extra-large size (such as approximately 11 GB), etc. Each of the pre-trained natural language processing model variants can require different hardware to execute and can have different performance metrics, such as taking several seconds to complete a natural language processing task or less than a second. However, the larger the size pre-trained natural language processing model, the better the expected predictive capabilities. The first language model (which can be referred to as a large pre-trained question answering model) can be larger in size than a second language model (which can be referred to as a small pre-trained question answering model). The output from the first language model can be used to retrain the second language model, to output an updated language model/question answering model. Thus, the second language model can be smaller in size, be executed on a computer with less memory and processing power, execute in faster time, and can achieve similar predictive results as a larger, slower to execute language model.

At block 916, signal data can be received. The data ingestion service 108 can receive signal data. The data ingestion service 108 can process signals from the signal data source(s) 130. The signal data can include computer-related activity, such as, but not limited to, network data, access data, profile data, database-related data, etc.

At block 918, anomalous computer-related activity can be detected. The inference service 110 can process the signal data to determine a detection event. The inference service 110 can determine that a computer-related action has been performed one or more times within a timeframe, which can indicate anomalous computer-related activity. The inference service 110 can determine a profile associated with the detection event. Additional details regarding determining a detection event are provided herein, such as with respect to FIG. 3.

At block 920, an enrichment can be determined. The inference service 110 can determine an enriched detection event(s) that co-occur with the detection event. As described herein, the inference service 110 can determine the combinations of co-occurring detection events and enriched detection events with Bayesian inference. Determining enrichments can include the execution of the blocks 922, 924, 926, some of which may be optional depending on the embodiment. At block 922, the inference service 110 can determine language model based enrichments. The inference service 110 can determine that the profile is associated with the communication text data, such as a transcript that includes text data. The inference service 110 can generate input data based at least in part on the communication text data. The inference service 110 can execute a language model, where the language model receives the input data and outputs a result. The inference service 110 can determine an enriched detection event based at least in part on (i) the detection event and (ii) the result. In some embodiments, the inference service 110 can process multiple sets of communication data (such as multiple transcripts for the same agent). The inference service 110 can generate, from at least the model results, aggregated data and determine that aggregated data satisfies a threshold. For example, the inference service 110 can aggregate/determine threshold satisfaction with a period of time (such as less than ten days, less than twenty days, less than thirty days, etc.), with a quantity (such as greater than 1, 3, 5, 10, 20 communications with a certain label), and/or with a percentage (such as greater than 0%, 2.5%, 5.0% of communications with a certain label). Additional details regarding making inferences with language models are described herein, such as with respect to FIGS. 5-6.

The inference service 110 can execute a question answering model to determine whether there is an enriched detection event. The question answering model can be a pre-trained model and/or a retrained model. The inference service 110 can generate input data based at least in part on (i) the first text data from a communication and (ii) second text data phrased as a question. The inference service 110 can concatenate the question text and the communication text data. Questions can include positive-negative questions (such as, yes-no questions), positive-neutral-or-negative questions, open-ended questions, questions that solicit answers in terms of degree, or any other type of question. For example: "In a yes/no response, did the agent address the user's problem?" "In a yes/no response, was a threat of violence made?" "In a yes/no response, did the user offer the agent money to perform a job?" "In a yes/no response, did the user ask the agent for a password?" The inference service 110 can execute a question answering model, where the question answering model receives the input data and outputs an answer. The inference service 110 can determine an enriched detection event based at least in part on (i) the detection event and (ii) the answer. For example, if there was a request for a password in the transcript, then the answer could be a "yes" or some other positive label, which can have co-occurred with the detection. Moreover, the inference service 110 can apply the question-answering model and the same question to multiple communications and determine if a threshold is satisfied for an aggregated version of the output data. For example, the inference service 110 can generate, from at least a first answer and a second answer, aggregated data; and determine that the aggregated data satisfies a threshold. As described herein, for output from a question answering model, the inference service 110 can aggregate/determine threshold satisfaction with a period of time (such as less than ten days, less than twenty days, less than thirty days, etc.), with a quantity (such as greater than 1, 3, 5, 10, 20 communications with a certain label), and/or with a percentage (such as greater than 0%, 2.5%, 5.0% of communications with a certain label). Additional details regarding making inferences with a question answering model are described herein, such as with respect to FIG. 5.

The inference service 110 can use a matrix data structure to generate aggregated data. The inference service 110 can generate a matrix data structure that includes (i) a first element representing a first result from a language model and (ii) a second element representing a second result from a language model (such as a "1" for a positive label and "0" for the absence of a label). The inference service 110 can group a row or column in the matrix data structure that results in a group of matrix elements. The inference service 110 can calculate the aggregated data from the group of matrix elements. For example, to determine a profile satisfying some threshold (such as a profile with greater than 1, 3, 5, 10, 20 communications with a certain label), the inference service 110 can group a row or column representing results for a particular enriched detection (such as transcripts where there was a request for a password) and aggregate the row or column (such as summing the elements). Additional details regarding matrices to determine enriched detections are described herein, such as with respect to FIG. 7.

The inference service 110 can determine multiple enriched detection events co-occurring with a detection event that are treated as a priority risk indicator. As described herein, the inference service 110 can determine multiple enrichments co-occurring with a detection that are more predictive than a detection alone for an attack with Bayesian inference and/or cliques. The inference service 110 can determine a second enriched detection event co-occurring with the first enriched detection event and the detection event.

At block 924, the inference service 110 can determine adversarial network based enrichments. The inference service 110 can determine language model based enrichments in combination with adversarial network based enrichments. Accordingly, the inference service 110 can identify a suspiciously high concentration of a certain intent coming from a suspiciously concentrated set of hierarchical data representations (such as phone numbers, IP addresses, or geolocation coordinates). The inference service 110 can receive requests, generate clusters from the requests, identify anomalous clusters, and/or determine common roots for the anomalous clusters. As described herein, the inference service 110 can a second enriched detection event co-occurring with the first enriched detection event and the detection event, where the second enriched detection event is an adversarial network based enrichment. The inference service 110 can receive a first request including a first source hierarchical data representation (such as a phone number, an IP address, or a geolocation coordinate) and a second request including a second source hierarchical data representation.

The inference service 110 can generate clusters from the requests. The inference service 110 can generate a first node representing the first request and a second node representing the second request. The inference service 110 can determine an edit distance (such as a Levenshtein distance between two strings/numbers) between the first source hierarchical data representation and the second source hierarchical data representation. The inference service 110 can determine that the edit distance satisfies a first threshold (such as an edit distance of less than or equal to 3). The inference service 110 can generate a cluster including the first node and the second node. The inference service 110 can add nodes to the cluster satisfying the threshold. Additional details regarding generating clusters are described herein, such as with respect to FIG. 8.

The inference service 110 can identify anomalous clusters. The inference service 110 can determine a first quantity of profile identifiers associated with the cluster. The inference service 110 can determine a second quantity of nodes in the cluster. The inference service 110 can determine that a ratio of the first quantity and the second quantity satisfies a second threshold. The inference service 110 can compare the determined ratio (such as the ratio of unique profile identifiers to the number of requests/nodes in a cluster) to a threshold ratio. If the ratio is less than the threshold ratio (or less than or equal to depending on the implementation), the inference service 110 can mark the cluster as anomalous for enriched detection purposes. Additional details regarding identifying adversarial network clusters are described herein, such as with respect to FIG. 8.

In some embodiments, the inference service 110 can determine common roots for the anomalous clusters. The inference service 110 can determine a common root from nodes in the cluster. A described herein, the inference service 110 can determine common root(s) as the ordered values in the hierarchical data representations that are shared among the nodes of the anomalous cluster. For example, a subset of IP addresses associated with an anomalous cluster may have the same values for the first 3 octets of the IP addresses (such as all nodes may be 192.141.8.XXX). Also, multiple phone numbers in a cluster may share the same X number of left-most digits.

At block 926, the inference service 110 can determine other enrichment(s). Additional enrichments can include, but are not limited to, sequence-based enrichments 314, peer-based anomalous network rights enrichments 316, peer-based unused rights enrichments 318, and/or other enrichments 320 described herein, such as with respect to FIG. 3. For example, another enrichment can include multiple logins for the same user profile and/or network address from different geolocations (such as zip codes) within a time period, which can indicate suspicious behavior. As described herein, the inference service 110 can determine multiple enrichments co-occurring with a detection that are more predictive than a detection alone for an attack with Bayesian inference and/or cliques.

At block 928, a ticket can be escalated. Where detection events co-occur with enriched detection events, the interface service 114 can cause a ticket associated with the enriched detection event indicating the anomalous computer-related activity to be escalated. The interface service 114 can transmit an escalation request to the security-incident-response system 140. An analyst can then review the ticket in the security-incident-response system 140 in a prioritized manner. In some embodiments, the security-incident-response system 140 can present the enriched detection events and/or metadata associated with the enriched detection events.

At block 930, an action can be executed. The interface service 114 can transmit a request to the security-incident-response system 140 to perform some action. The interface service 114 can cause a computing device associated with the profile to be blocked from accessing a network service. The detection and enrichment system 104 can receive a network request for a network service, where the network request include a source hierarchical data representation associated with the computing device. The interface service 114 can transmit, to the security-incident-response system 140, a block request comprising the source IP address.

Additionally or alternatively, the interface service 114 can instruct the user facing system 150 of the priority risk indicator, which can cause the user facing system 150 to execute an action with respect to the profile. In some embodiments, the user facing system 150 can block ingress network traffic originating from the range of IP addresses or specific IP address(es) associated with the profile. In some embodiments, the user facing system 150 can block the first participant profile from access to a service, such as, being able to order from the electronic catalog or the ability to register computing devices.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied. The term "substantially" when used in conjunction with the term "real time" can refer to speeds in which no or little delay occurs.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for detecting cybersecurity attacks, comprising:
   a non-transitory data storage medium to store a first transcript, wherein the first transcript comprises first text data; and
   a computer hardware processor in communication with the non-transitory data storage medium, wherein the computer hardware processor executes computer-executable instructions to at least:
      receive signal data comprising at least one of network data, access data, profile data, or database-related data;
      identify, from the signal data, a detection event indicating anomalous computer-related activity;
      determine a profile associated with the detection event;
      determine that the profile is associated with the first transcript;
      generate first input data based at least in part on (i) the first text data and (ii) second text data phrased as a first yes-no question;
      execute a question answering model, wherein the question answering model receives the first input data and outputs a first yes-no answer;
      determine a first enriched detection event based at least in part on (i) the detection event and (ii) the first yes-no answer; and
      cause a computing device associated with the profile to be blocked from accessing a network service.

2. The system of claim 1, wherein the computer hardware processor executes further computer-executable instructions to at least:
   determine that the profile is associated with a second transcript;

generate second input data based at least in part on (i) the second transcript and (ii) the second text data phrased as the first yes-no question; and execute the question answering model, wherein the question answering model receives the second input data and outputs a second yes-no answer, wherein to determine the first enriched detection event based at least in part on the first yes-no answer, the computer hardware processor executes the further computer-executable instructions to at least:

generate, from at least the first yes-no answer and the second yes-no answer, aggregated data; and determine that the aggregated data satisfies a threshold.

3. The system of claim 1, wherein the computer hardware processor executes further computer-executable instructions to at least:

receive a first network request comprising a first source IP address;

generate a first node representing the first network request;

receive a second network request comprising a second source IP address;

generate a second node representing the second network request;

determine that an edit distance between the first source IP address and the second source IP address satisfies a first threshold;

generate a cluster comprising the first node and the second node;

determine a first quantity of profile identifiers associated with the cluster;

determine a second quantity of nodes in the cluster;

determine that a ratio of the first quantity and the second quantity satisfies a second threshold; and determine a second enriched detection event co-occurring with the first enriched detection event and the detection event based at least in part on the ratio satisfies the second threshold.

4. The system of claim 3, wherein the computer hardware processor executes additional computer-executable instructions to at least:

determine a common root from nodes in the cluster;

receive a network request for the network service, the network request comprising a source IP address associated with the computing device; and determine that the source IP address comprises the common root, wherein to cause the computing device to be blocked from accessing the network service, the computer hardware processor executes the additional computer-executable instructions to at least:

transmit, to a security-incident-response system, a block request comprising the source IP address.

5. A computer-implemented method comprising:

receiving signal data;

identifying, from the signal data, a detection event indicating anomalous computer-related activity;

determining a profile associated with the detection event;

determining that the profile is associated with first communication text data;

generating first input data based at least in part on the first communication text data;

execute a language model, wherein the language model receives the first input data and outputs a first result;

determining a first enriched detection event based at least in part on (i) the detection event and (ii) the first result; and causing, in a security-incident-response system, a ticket associated with the first enriched detection event indicating the anomalous computer-related activity to be escalated.

6. The computer-implemented method of claim 5, wherein the language model corresponds to a pre-trained question answering model, and wherein generating the first input data further comprises:

concatenating (i) text comprising a question and (ii) the first communication text data.

7. The computer-implemented method of claim 5, further comprising:

retraining a pre-trained language model with supervised machine learning and a training data set comprising a text corpus and a label, wherein retraining the pre-trained language model further comprises:

outputting the language model.

8. The computer-implemented method of claim 5, further comprising:

determining that the profile is associated with second communication text data;

generate second input data based at least in part on the second communication text data; and executing the language model, wherein the language model receives the second input data and outputs a second result, wherein determining the first enriched detection event comprises:

generating, from at least the first result and the second result, aggregated data; and determining that the aggregated data satisfies a threshold.

9. The computer-implemented method of claim 8, wherein generating the aggregated data further comprises:

generating a matrix data structure comprising (i) a first element representing the first result and (ii) a second element representing the second result.

10. The computer-implemented method of claim 9, wherein generating the aggregated data further comprises:

grouping a row or column in the matrix data structure that results in a group of matrix elements; and calculating the aggregated data from the group of matrix elements.

11. The computer-implemented method of claim 5, wherein the detection event is associated with a detection event type and the first enriched detection event is associated with an enriched detection event type, further comprising:

calculating, from historical data, a first quantity of detection events of the detection event type without an enriched detection event of the enriched detection event type;

calculating, from the historical data, a second quantity of detection events of the detection event type co-occurring with a respective enriched detection event of the enriched detection event type; and determining, from the first quantity of detection events and the second quantity of detection events, that a first likelihood of a suspected attack given any detection event of the detection event type co-occurring with the respective enriched detection event is higher than a second likelihood of any detection event of the detection event type without the enriched detection event.

12. The computer-implemented method of claim 5, wherein the detection event is associated with a detection event type and the first enriched detection event is associated with an enriched detection event type and a first threshold value, further comprising:

calculating, from historical data, a first likelihood of a first suspected attack given any detection event of the detection event type co-occurring with any enriched detection event of the enriched detection event type satisfying the first threshold value;

calculating, from the historical data, a second likelihood of a second suspected attack given any detection event of the detection event type co-occurring with any enriched detection event of the enriched detection event type satisfying a second threshold value; and selecting the first threshold value instead of the second threshold value based at least in part on the first likelihood being more likely than the second likelihood.

13. A system comprising:

a non-transitory data storage medium to store first communication text data, wherein the first communication text data comprises first text data; and a computer hardware processor in communication with the non-transitory data storage medium, wherein the computer hardware processor executes computer-executable instructions to at least:

receive signal data;

identify, from the signal data, a detection event associated indicating anomalous computer-related activity;

determine a profile associated with the detection event;

determine that the profile is associated with the first communication text data;

generating input data based at least in part on the first text data;

execute a language model, wherein the language model receives the input data and outputs a first result;

determine a first enriched detection event based at least in part on (i) the detection event and (ii) the first result; and cause, in a security-incident-response system, a ticket associated with the first enriched detection event indicating the anomalous computer-related activity to be escalated.

14. The system of claim 13, wherein the computer hardware processor executes further computer-executable instructions to at least:

determine a second enriched detection event co-occurring with the first enriched detection event and the detection event, wherein the ticket is further associated with the second enriched detection event.

15. The system of claim 14, wherein the computer hardware processor executes additional computer-executable instructions to at least:

determine, from historical data, a plurality of enriched detection events;

generate a graph network, wherein each node from the graph network is associated with an enriched detection event and an edge between two nodes corresponds to co-occurring enriched detection events; and identify, from the graph network, a clique satisfying a threshold, wherein the clique comprises (i) a first node associated with the first enriched detection event and (ii) a second node associated with the second enriched detection event.

16. The system of claim 14, wherein to determine the second enriched detection event co-occurring with the first enriched detection event and the detection event, the computer hardware processor executes additional computer-executable instructions to at least:

receive a first request comprising a first source hierarchical data representation;

generate a first node representing the first request;

receive a second request comprising a second source hierarchical data representation;

generate a second node representing the second request;

determine that an edit distance between the first source hierarchical data representation and the second source hierarchical data representation satisfies a first threshold;

generate a cluster comprising the first node and the second node;

determine a first quantity of profile identifiers associated with the cluster;

determine a second quantity of nodes in the cluster; and determine that a ratio of the first quantity and the second quantity satisfies a second threshold.

17. The system of claim 16, wherein the first source hierarchical data representation corresponds to a phone number, an IP address, or a geolocation coordinate.

18. The system of claim 13, wherein the computer hardware processor executes additional computer-executable instructions to at least:

determine that the profile is associated with second communication text data;

generate second input data based at least in part on the second communication text data; and executing the language model, wherein the language model receives the second input data and outputs a second result, wherein to determine the first enriched detection event, the computer hardware processor executes the additional computer-executable instructions to at least:

generate, from at least the first result and the second result, aggregated data; and determine that the aggregated data satisfies a threshold.

19. The system of claim 18, wherein the threshold comprises a period of time, a quantity, or a percentage.

20. The system of claim 18, wherein to generate the aggregated data, the computer hardware processor executes further computer-executable instructions to at least:

generate a matrix data structure comprising (i) a first element representing the first result and (ii) a second element representing the second result;

group a row or column in the matrix data structure that results in a group of matrix elements; and calculate the aggregated data from the group of matrix elements.

* * * * *